US010522076B2

(12) United States Patent
Yamazaki et al.

(10) Patent No.: US 10,522,076 B2
(45) Date of Patent: Dec. 31, 2019

(54) DISPLAY SYSTEM AND ELECTRICAL APPLIANCE

(71) Applicant: Semiconductor Energy Laboratory Co., Ltd., Atsugi-shi, Kanagawa-ken (JP)

(72) Inventors: Shunpei Yamazaki, Tokyo (JP); Jun Koyama, Kanagawa (JP); Noriko Ishimaru, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 0 days.

(21) Appl. No.: 15/175,270

(22) Filed: Jun. 7, 2016

(65) Prior Publication Data

US 2016/0365029 A1 Dec. 15, 2016

Related U.S. Application Data

(63) Continuation of application No. 14/801,045, filed on Jul. 16, 2015, now Pat. No. 9,368,089, which is a (Continued)

(30) Foreign Application Priority Data

Jan. 17, 2000 (JP) ................................ 2000-008419

(51) Int. Cl.
*G06F 1/00* (2006.01)
*G09G 3/3233* (2016.01)
(Continued)

(52) U.S. Cl.
CPC ............. *G09G 3/3233* (2013.01); *G09G 3/30* (2013.01); *G09G 5/10* (2013.01); *G09G 3/2022* (2013.01);
(Continued)

(58) Field of Classification Search
CPC .. G09G 5/00; G06F 1/00; G06F 3/012; G06F 3/013; G06F 3/017
See application file for complete search history.

(56) References Cited

U.S. PATENT DOCUMENTS 4,356,429 A 10/1982 Tang
4,539,507 A 9/1985 Vanslyke et al.
(Continued)

FOREIGN PATENT DOCUMENTS

CN 001217806 A 5/1999
EP 0484965 A 5/1992
(Continued)

OTHER PUBLICATIONS

Huang.T et al., "A New Stack Capacitor for Polysilicon Active Matrix Arrays", IEDM 89: Technical Digest of International Electron Devices Meeting, Dec. 3, 1989, pp. 357-360.
(Continued)

*Primary Examiner* — Michael A Faragalla
(74) *Attorney, Agent, or Firm* — Fish & Richardson P.C.

(57) ABSTRACT

A display system in which the luminance of light-emitting elements in a light-emitting device is adjusted based on information on an environment. A sensor obtains information on an environment as an electrical signal. A CPU converts, based on comparison data set in advance, the information signal into a correction signal for correcting the luminance of EL elements. Upon receiving this correction signal, a voltage changer applies a predetermined corrected potential to the EL elements. Thus, this display system enables control of the luminance of the EL elements.

5 Claims, 21 Drawing Sheets

Related U.S. Application Data continuation of application No. 14/275,961, filed on May 13, 2014, now Pat. No. 9,087,476, which is a continuation of application No. 13/587,968, filed on Aug. 17, 2012, now Pat. No. 8,743,028, which is a continuation of application No. 12/618,926, filed on Nov. 16, 2009, now Pat. No. 8,253,662, which is a continuation of application No. 09/752,817, filed on Jan. 3, 2001, now Pat. No. 7,688,290.

(51) Int. Cl.
*G09G 3/30* (2006.01)
*G09G 5/10* (2006.01)
*G09G 3/20* (2006.01)

(52) U.S. Cl.
CPC ............... *G09G 2300/0426* (2013.01); *G09G 2300/0809* (2013.01); *G09G 2300/0842* (2013.01); *G09G 2320/029* (2013.01); *G09G 2320/043* (2013.01); *G09G 2320/064* (2013.01); *G09G 2320/0626* (2013.01); *G09G 2320/0646* (2013.01); *G09G 2330/021* (2013.01); *G09G 2330/028* (2013.01); *G09G 2354/00* (2013.01); *G09G 2360/14* (2013.01); *G09G 2360/144* (2013.01); *G09G 2360/145* (2013.01)

(56) References Cited

U.S. PATENT DOCUMENTS 4,655,552 A 4/1987 Togashi et al.
4,720,432 A 1/1988 Vanslyke et al.
4,760,389 A 7/1988 Aoki et al.
4,769,292 A 9/1988 Tang et al.
4,885,211 A 12/1989 Tang et al.
4,894,777 A 1/1990 Negishi et al.
4,950,950 A 8/1990 Perry et al.
5,008,218 A 4/1991 Kawachi et al.
5,047,687 A 9/1991 Vanslyke
5,059,861 A 10/1991 Littman et al.
5,059,862 A 10/1991 Vanslyke et al.
5,061,617 A 10/1991 Maskasky
5,073,446 A 12/1991 Scozzafava et al.
5,075,596 A 12/1991 Young et al.
5,151,629 A 9/1992 Vanslyke
5,225,822 A 7/1993 Shiraishi et al.
5,294,869 A 3/1994 Tang et al.
5,294,870 A 3/1994 Tang et al.
5,302,966 A 4/1994 Stewart
5,313,055 A 5/1994 Shiratsuki et al.
5,406,305 A 4/1995 Shimomura et al.
5,485,172 A 1/1996 Sawachika et al.
5,510,851 A 4/1996 Foley et al.
5,530,240 A 6/1996 Larson et al.
5,550,066 A 8/1996 Tang et al.
5,614,730 A 3/1997 Nakazawa et al.
5,617,112 A 4/1997 Yoshida et al.
5,684,365 A 11/1997 Tang et al.
5,702,323 A 12/1997 Poulton
5,714,968 A 2/1998 Ikeda
5,744,824 A 4/1998 Kousai et al.
5,747,930 A 5/1998 Utsugi
5,747,938 A * 5/1998 Beard ............... H02M 3/33576 315/169.3
5,760,760 A 6/1998 Helms
5,831,693 A 11/1998 Mccartney et al.
5,839,456 A 11/1998 Han
5,844,530 A 12/1998 Tosaki
5,854,661 A 12/1998 Kochanski
5,877,832 A 3/1999 Shimada
5,886,474 A 3/1999 Asai et al.
5,956,015 A 9/1999 Hino
5,962,962 A 10/1999 Fujita et al.
5,977,935 A * 11/1999 Yasukawa ............ G02B 27/017 340/980
5,982,348 A 11/1999 Nakajima et al.
5,990,629 A 11/1999 Yamada et al.
5,993,000 A 11/1999 Kobayashi et al.
6,005,350 A 12/1999 Hachiya et al.
6,033,075 A 3/2000 Fujieda et al.
6,050,717 A 4/2000 Kosugi et al.
6,088,006 A * 7/2000 Tabata ............... H04N 13/0275 345/7
6,091,196 A 7/2000 Codama
6,091,827 A 7/2000 Tanaka
6,108,056 A 8/2000 Nakajima et al.
6,115,007 A 9/2000 Yamazaki
6,123,661 A 9/2000 Fukushima et al.
6,141,034 A * 10/2000 McCutchen ........... G02B 27/22 348/36
6,147,451 A * 11/2000 Shibata ................ G09G 3/3225 313/506
6,147,667 A 11/2000 Yamazaki et al.
6,177,767 B1 1/2001 Asai et al.
6,177,952 B1 * 1/2001 Tabata ................. G02B 27/017 348/47
6,194,837 B1 2/2001 Ozawa
6,229,508 B1 5/2001 Kane
6,229,531 B1 5/2001 Nakajima et al.
6,243,069 B1 6/2001 Ogawa et al.
6,262,767 B1 7/2001 Wakui
6,265,833 B1 7/2001 Kim et al.
6,271,813 B1 8/2001 Palalau
6,271,818 B1 8/2001 Yamazaki et al.
6,297,791 B1 10/2001 Naito et al.
6,307,948 B1 10/2001 Kawasaki et al.
6,329,964 B1 12/2001 Tanaka
6,337,675 B1 1/2002 Toffolo et al.
6,359,606 B1 3/2002 Yudasaka
6,392,617 B1 5/2002 Gleason
6,417,825 B1 7/2002 Stewart et al.
6,424,326 B2 7/2002 Yamazaki et al.
6,462,722 B1 10/2002 Kimura et al.
6,466,334 B1 10/2002 Komiya et al.
6,469,683 B1 10/2002 Suyama et al.
6,479,940 B1 11/2002 Ishizuka
6,483,484 B1 11/2002 Yamazaki et al.
6,518,962 B2 2/2003 Kimura et al.
6,522,315 B2 2/2003 Ozawa et al.
6,528,951 B2 3/2003 Yamazaki et al.
6,535,207 B1 3/2003 Hiroki
6,541,918 B1 4/2003 Yudasaka
6,545,424 B2 4/2003 Ozawa
6,614,076 B2 9/2003 Kawasaki et al.
6,618,030 B2 9/2003 Kane et al.
6,707,484 B1 3/2004 Kawasaki et al.
6,714,174 B2 3/2004 Suyama et al.
6,734,839 B2 5/2004 Yudasaka
6,774,574 B1 8/2004 Koyama
6,777,887 B2 8/2004 Koyama
6,828,951 B2 12/2004 Yamazaki et al.
6,839,045 B2 1/2005 Ozawa et al.
6,853,083 B1 2/2005 Yamauchi et al.
6,856,360 B1 2/2005 Higuchi et al.
6,995,753 B2 2/2006 Yamazaki et al.
7,015,503 B2 3/2006 Seki et al.
7,068,246 B2 6/2006 Yamazaki et al.
7,180,483 B2 2/2007 Kimura et al.
7,209,097 B2 4/2007 Suyama et al.
7,214,959 B2 5/2007 Seki et al.
7,221,339 B2 5/2007 Ozawa et al.
7,248,232 B1 7/2007 Yamazaki et al.
7,253,793 B2 8/2007 Ozawa et al.
7,256,760 B2 8/2007 Yamazaki et al.
7,273,801 B2 9/2007 Seki et al.
7,336,244 B2 2/2008 Suyama et al.
7,358,531 B2 4/2008 Koyama
7,362,322 B2 4/2008 Kimura et al.
7,403,238 B2 7/2008 Higuchi et al.
7,442,955 B2 10/2008 Seki et al.
7,612,376 B2 11/2009 Yamazaki et al.
7,688,290 B2 3/2010 Yamazaki et al.

(56) References Cited

U.S. PATENT DOCUMENTS

| | | | |
|---|---|---|---|
| 7,710,364 | B2 | 5/2010 | Ozawa et al. |
| 7,760,868 | B2 | 7/2010 | Kawasaki et al. |
| 7,880,696 | B2 | 2/2011 | Ozawa et al. |
| 7,932,518 | B2 | 4/2011 | Seki et al. |
| 7,982,222 | B2 | 7/2011 | Koyama |
| 8,154,199 | B2 | 4/2012 | Ozawa et al. |
| 8,188,647 | B2 | 5/2012 | Kimura et al. |
| 8,247,967 | B2 | 8/2012 | Ozawa et al. |
| 8,253,662 | B2 | 8/2012 | Yamazaki et al. |
| 8,354,978 | B2 | 1/2013 | Ozawa et al. |
| 8,362,489 | B2 | 1/2013 | Kimura et al. |
| 8,514,261 | B2 | 8/2013 | Kawasaki et al. |
| 8,605,010 | B2 | 12/2013 | Yamazaki et al. |
| 2001/0035848 | A1 | 11/2001 | Johnson et al. |
| 2002/0011978 | A1 | 1/2002 | Yamazaki et al. |
| 2002/0033783 | A1 | 3/2002 | Koyama |
| 2002/0044208 | A1 | 4/2002 | Yamazaki et al. |
| 2002/0047550 | A1 | 4/2002 | Tanada |
| 2002/0180672 | A1 | 12/2002 | Yamazaki et al. |
| 2002/0196206 | A1 | 12/2002 | Kimura et al. |
| 2003/0132716 | A1 | 7/2003 | Yamazaki et al. |
| 2003/0231273 | A1 | 12/2003 | Kimura et al. |
| 2004/0201583 | A1 | 10/2004 | Burroughes et al. |
| 2005/0099529 | A1 | 5/2005 | Hattori |
| 2006/0082568 | A1 | 4/2006 | Yamazaki et al. |
| 2006/0273995 | A1 | 12/2006 | Ozawa et al. |
| 2006/0273996 | A1 | 12/2006 | Ozawa et al. |
| 2007/0097021 | A1 | 5/2007 | Yamazaki et al. |
| 2008/0246700 | A1 | 10/2008 | Ozawa et al. |
| 2009/0072758 | A1 | 3/2009 | Kimura et al. |
| 2009/0167148 | A1 | 7/2009 | Kimura et al. |
| 2010/0066652 | A1 | 3/2010 | Ozawa et al. |
| 2010/0097410 | A1 | 4/2010 | Ozawa et al. |
| 2011/0260172 | A1 | 10/2011 | Koyama |
| 2012/0299902 | A1 | 11/2012 | Ozawa et al. |

FOREIGN PATENT DOCUMENTS

| | | | |
|---|---|---|---|
| EP | 0684753 | A | 11/1995 |
| EP | 0717439 | A | 6/1996 |
| EP | 0717445 | A | 6/1996 |
| EP | 0717446 | A | 6/1996 |
| EP | 0781075 | A | 6/1997 |
| EP | 0785457 | A | 7/1997 |
| EP | 0893940 | A | 1/1999 |
| EP | 0895219 | A | 2/1999 |
| EP | 0905673 | A | 3/1999 |
| EP | 0917127 | A | 5/1999 |
| EP | 0923067 | A | 6/1999 |
| EP | 0932137 | A | 7/1999 |
| EP | 0947158 | A | 10/1999 |
| EP | 0961525 | A | 12/1999 |
| EP | 0989534 | A | 3/2000 |
| EP | 0989778 | A | 3/2000 |
| EP | 0992969 | A | 4/2000 |
| EP | 1063630 | A | 12/2000 |
| EP | 1117085 | A | 7/2001 |
| EP | 1255240 | A | 11/2002 |
| EP | 1336953 | A | 8/2003 |
| EP | 1337131 | A | 8/2003 |
| EP | 1359789 | A | 11/2003 |
| EP | 1363265 | A | 11/2003 |
| EP | 1505649 | A | 2/2005 |
| EP | 1619654 | A | 1/2006 |
| EP | 1793650 | A | 6/2007 |
| EP | 1798592 | A | 6/2007 |
| EP | 1830342 | A | 9/2007 |
| EP | 1830343 | A | 9/2007 |
| EP | 1830344 | A | 9/2007 |
| EP | 2372682 | A | 10/2011 |
| GB | 2337680 | | 11/1999 |
| JP | 59-195268 | A | 11/1984 |
| JP | 63-032624 | A | 2/1988 |
| JP | 02-082571 | A | 3/1990 |
| JP | 03-141588 | A | 6/1991 |
| JP | 03-182723 | A | 8/1991 |
| JP | 04-026289 | A | 1/1992 |
| JP | 04-223334 | A | 8/1992 |
| JP | 04-326849 | A | 11/1992 |
| JP | 05-027266 | A | 2/1993 |
| JP | 05-088655 | A | 4/1993 |
| JP | 05-165450 | A | 7/1993 |
| JP | 05-183943 | A | 7/1993 |
| JP | 05-241512 | A | 9/1993 |
| JP | 05-241767 | A | 9/1993 |
| JP | 06-059889A | U | 8/1994 |
| JP | 06-214508 | A | 8/1994 |
| JP | 06-335007 | A | 12/1994 |
| JP | 07-005409 | A | 1/1995 |
| JP | 07-067055 | A | 3/1995 |
| JP | 07-067056 | A | 3/1995 |
| JP | 07-084211 | A | 3/1995 |
| JP | 07-122361 | A | 5/1995 |
| JP | 07-129095 | A | 5/1995 |
| JP | 07-312290 | A | 11/1995 |
| JP | 08-006053 | A | 1/1996 |
| JP | 08-044861 | A | 2/1996 |
| JP | 08-050310 | A | 2/1996 |
| JP | 08-078159 | A | 3/1996 |
| JP | 08-160348 | A | 6/1996 |
| JP | 08-234683 | A | 9/1996 |
| JP | 08-241047 | A | 9/1996 |
| JP | 08-241048 | A | 9/1996 |
| JP | 08-292752 | A | 11/1996 |
| JP | 08-314423 | A | 11/1996 |
| JP | 08-320454 | A | 12/1996 |
| JP | 09-081070 | A | 3/1997 |
| JP | 09-090906 | A | 4/1997 |
| JP | 09-115673 | A | 5/1997 |
| JP | 09-218375 | A | 8/1997 |
| JP | 09-245963 | A | 9/1997 |
| JP | 09-288283 | A | 11/1997 |
| JP | 09-297282 | A | 11/1997 |
| JP | 09-304730 | A | 11/1997 |
| JP | 09-304793 | A | 11/1997 |
| JP | 10-123550 | A | 5/1998 |
| JP | 10-127769 | A | 5/1998 |
| JP | 10-187066 | A | 7/1998 |
| JP | 10-189252 | A | 7/1998 |
| JP | 10-197897 | A | 7/1998 |
| JP | 10-223376 | A | 8/1998 |
| JP | 10-232649 | A | 9/1998 |
| JP | 10-247587 | A | 9/1998 |
| JP | 10-255975 | A | 9/1998 |
| JP | 10-268842 | A | 10/1998 |
| JP | 10-319240 | A | 12/1998 |
| JP | 10-319872 | A | 12/1998 |
| JP | 10-319910 | A | 12/1998 |
| JP | 10-320109 | A | 12/1998 |
| JP | 10-335060 | A | 12/1998 |
| JP | 11-024549 | A | 1/1999 |
| JP | 11-024604 | A | 1/1999 |
| JP | 11-038891 | A | 2/1999 |
| JP | 11-044862 | A | 2/1999 |
| JP | 11-054268 | A | 2/1999 |
| JP | 11-074073 | A | 3/1999 |
| JP | 11-097169 | A | 4/1999 |
| JP | 11-133937 | A | 5/1999 |
| JP | 11-136598 | A | 5/1999 |
| JP | 11-160735 | A | 6/1999 |
| JP | 11-219146 | A | 8/1999 |
| JP | 11-231805 | A | 8/1999 |
| JP | 11-237581 | A | 8/1999 |
| JP | 11-282404 | A | 10/1999 |
| JP | 11-311972 | A | 11/1999 |
| JP | 11-341393 | A | 12/1999 |
| JP | 2000-002856 | A | 1/2000 |
| JP | 2000-012215 | A | 1/2000 |
| JP | 2000-235366 | A | 8/2000 |
| JP | 2001-005426 | A | 1/2001 |
| JP | 2001-035655 | A | 2/2001 |
| JP | 2001-092412 | A | 4/2001 |
| JP | 2001-272968 | A | 10/2001 |
| KR | 1998-0024399 | A | 7/1998 |

(56) References Cited

FOREIGN PATENT DOCUMENTS

| | | | |
|---|---|---|---|
| KR | 1998-0024400 | A | 7/1998 |
| TW | 382687 | | 2/2000 |
| WO | WO-1998/009433 | | 3/1998 |
| WO | WO-1998/033165 | | 7/1998 |
| WO | WO-1998/036406 | | 8/1998 |
| WO | WO-1998/036407 | | 8/1998 |
| WO | WO-1998/040871 | | 9/1998 |
| WO | WO-1999/040559 | | 8/1999 |
| WO | WO-1999/046748 | | 9/1999 |
| WO | WO-1999/048339 | | 9/1999 |
| WO | WO-1999/053472 | | 10/1999 |

OTHER PUBLICATIONS

Office Action (Application No. 200510053042.2) dated Apr. 27, 2007.
Office Action (Application No. 0011030186) dated Mar. 5, 2004.
European Office Action (Application No. 01100997.4) dated Oct. 14, 2010.
European Official Communication (Application No. 01100997.4) dated Mar. 26, 2013.

* cited by examiner

DISPLAY SYSTEM AND ELECTRICAL APPLIANCE

CROSS-REFERENCE TO RELATED APPLICATIONS

This application is a continuation of U.S. application Ser. No. 14/801,045, filed Jul. 16, 2015, now allowed, which is a continuation of U.S. application Ser. No. 14/275,961, filed May 13, 2014, now U.S. Pat. No. 9,087,476, which is a continuation of U.S. application Ser. No. 13/587,968, filed Aug. 17, 2012, now U.S. Pat. No. 8,743,028, which is a continuation of U.S. application Ser. No. 12/618,926, filed Nov. 16, 2009, now U.S. Pat. No. 8,253,662, which is a continuation of U.S. application Ser. No. 09/752,817, filed Jan. 3, 2001, now U.S. Pat. No. 7,688,290, which claims the benefit of a foreign priority application filed in Japan as Serial No. 2000-008419 on Jan. 17, 2000, all of which are incorporated by reference.

BACKGROUND OF THE INVENTION

1. Field of the Invention

The present invention relates to a display system and an electrical appliance capable of brightness control based on information on surroundings.

2. Description of the Related Art

In recent years, the development of display devices using electro luminescent (EL) elements (hereinafter referred to as EL display device) has been advanced. EL elements are of self-light-emitting type devised by utilizing the phenomena of electro luminescence (including fluorescence and phosphorescence) from organic EL materials. Since EL display devices are of a self-light-emitting type, they require no backlight such as that for liquid crystal display devices and have a large viewing angle. For this reason, EL display devices are regarded as a promising display portion for use in portable devices used outdoors.

There are two types of EL display devices: a passive type (simple matrix type) and an active type (active matrix type). The development of either type of EL display devices is being promoted. In particular, active matrix EL display devices are presently receiving attention. Organic materials for forming light-emitting layers of EL elements are grouped into low-molecular (monomeric) organic EL materials and high-molecular (polymeric) organic EL materials. Studies of these kinds of materials are being actively made.

None of EL display devices and light-emitting devices including semiconductor diodes, heretofore known, has any function of controlling the luminance of a light-emitting element in the light-emitting device based on information on surroundings of the light-emitting device.

SUMMARY OF THE INVENTION

The present invention has been made in view of the above, and an object of the present invention is therefore to provide a display system which enables luminance control of a light-emitting device, e.g., an EL display device based on environment information on surroundings in which the EL display device is used or living-body information on a person using the EL display device, and also to provide an electrical appliance using the display system.

In an EL display device provided to solve the above-described problem, the luminance of an EL element formed of a cathode, an EL layer and an anode can be controlled through control of the current flowing through the EL element, and the current flowing through the EL element can be controlled by changing a potential applied to the EL element.

According to the present invention, a display system described below is used.

First, information on an environment in which the EL display device is used is obtained as an information signal by at least one of sensors, including light-receiving elements, such as a photo diode and a CdS photoconductive cell, charge-coupled devices (CCD), and CMOS sensors. When the sensor inputs the information signal as an electrical signal to a central processing unit (CPU), the CPU converts the electrical signal into a signal for controlling a potential applied to the EL element to adjust the luminance of the EL element. In this specification, the signal converted and outputted by the CPU will be referred to as a correction signal. This correction signal is inputted to a voltage changer to control the potential applied to one side of the EL element opposite from the side connected to a TFT. It is to be noted that this controlled potential will be herein referred to as a corrected potential.

An EL display or an electrical appliance can be provided in which the above-described display system is used to control the current flowing through the EL element to perform luminance adjustment based on information on an environment.

In this specification, information on surroundings includes environment information on surroundings in which the EL display device is used, and living-body information on a person who uses the EL display device. Further, the environment information includes information on the lightness (the amount of visible light and/or infrared light), temperature, humidity and the like, and the living-body information includes information on the degree of congestion in the user's eyes, pulsation, blood pressure, body temperature, the opening in the iris and the like.

According to the present invention, in case of a digital drive system, the voltage changer connected to the EL element applies a corrected potential based on information on surroundings to control the potential difference across the EL element, thereby obtaining the desired luminance. On the other hand, in case of an analog drive system, the voltage changer connected to the EL element applies a corrected potential based on information on surroundings to control the potential difference across the EL element, and the potential of an analog signal is controlled such that the contrast is optimized with respect to the controlled potential difference, thereby obtaining the desired luminance. These methods enable implementation of the present invention by using either of the digital or analog system.

The above-described sensor may be formed integrally with the EL display device.

In order to enable the EL element to emit light, the current control TFT for controlling the current flowing through the EL element has a larger current flowing through itself in comparison with a switching TFT for controlling driving of the current control TFT. When driving of the TFT is controlled, the voltage applied to a gate electrode of the TFT is controlled to turn on or off the TFT. According to the present invention, when there is a need to reduce the luminance based on information on surroundings, a smaller current is caused to flow through the current control TFT.

The EL (electro-luminescent) display devices referred to in this specification include triplet-based light emission devices and/or singlet-based light emission devices, for example.

DETAILED DESCRIPTION OF THE PREFERRED EMBODIMENTS

Figure 1:
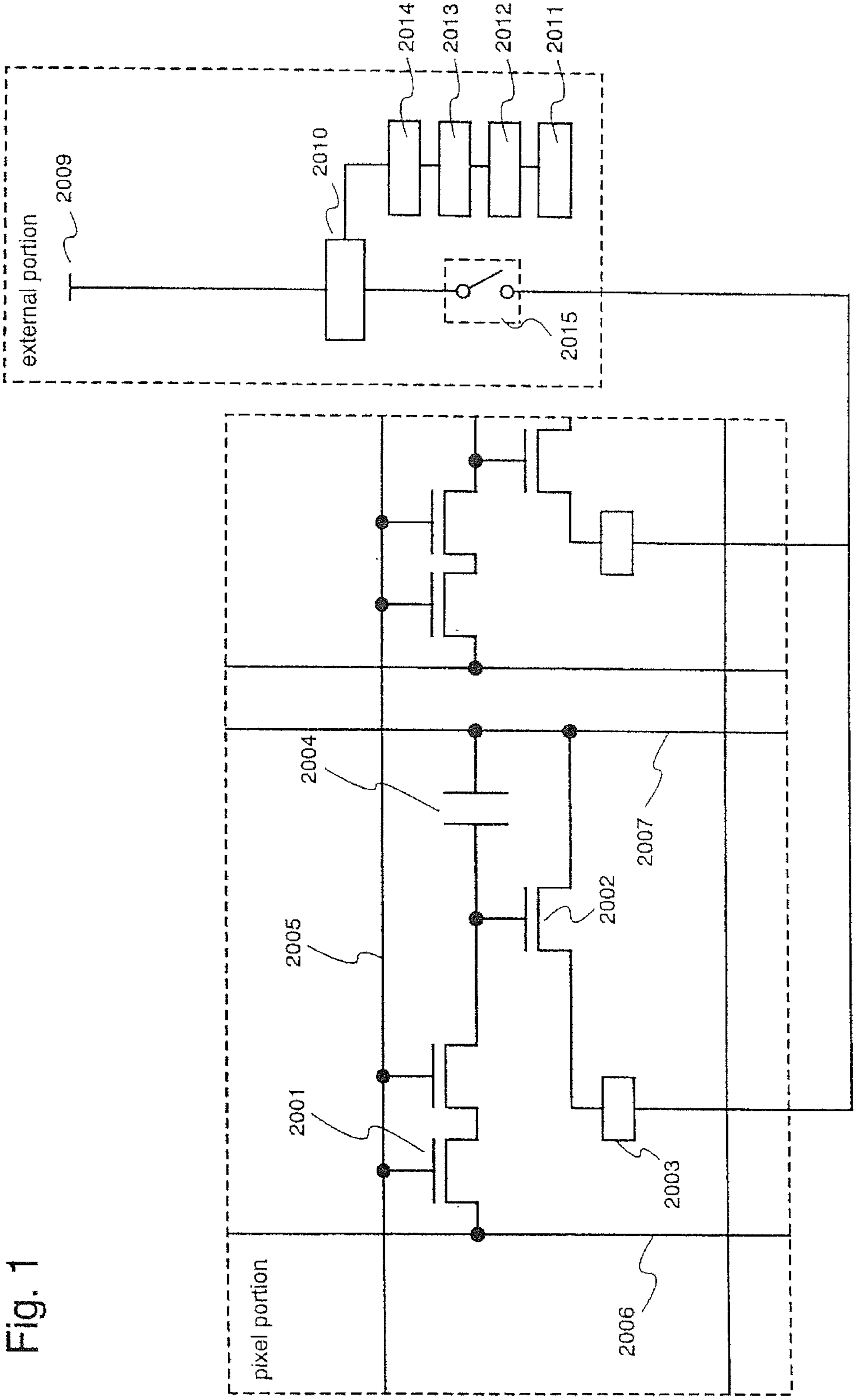
FIG. 1 is a diagram showing the configuration of an information-responsive EL display system.

FIG. 1 schematically shows the configuration of a display system for an information-responsive EL display device according to the present invention, which will be described with respect to digital driving for time-division gray-scale display. As shown in FIG. 1, the display system has a thin-film transistor (TFT) 2001 which functions as a switching device (hereinafter referred to as switching TFT), a TFT 2002 which functions as a device (current control device) for controlling a current supplied to an EL element 2003 (hereinafter referred to as current control TFT or EL driver TFT), and a capacitor 2004 (called a storage capacitor or a supplementary capacitor). The switching TFT 2001 is connected to a gate line 2005 and to a source line (data line) 2006. The drain of the current control TFT 2002 is connected to the EL element 2003 while the source is connected to a power supply line 2007.

When the gate line 2005 is selected, the switching TFT 2001 is turned on by a potential applied to its gate, the capacitor 2004 is charged by a data signal of the source line 2006, and the current control TFT 2002 is then turned on by a potential applied to its gate. After turn-off of the switching TFT 2001, the on state of the current control TFT 2002 is maintained by the charge accumulated in the capacitor 2004. The EL element 2003 emits light while the current control TFT 2002 is being maintained in the on state. The amount of light emitted from the EL element 2003 is determined by the current flowing through the EL element 2003.

The current flowing through the EL element 2003 in such a state is controlled through control of the difference between a potential applied to the power supply line (referred to as EL driving potential in this specification) and a potential controlled on the basis of a correction signal inputted to a voltage changer 2010 (referred to as corrected potential in this specification). In this embodiment mode, the EL driving potential is maintained at a constant level.

The voltage changer 2010 can change a voltage supplied from an EL driving power source 2009 between plus and minus values to control the corrected potential.

In digital driving for gray-scale display according to the present invention, the current control TFT 2002 is turned on or off by a data signal supplied to the gate of the current control TFT 2002 from the source line 2006.

In this specification, of two electrodes of the EL element, one connected to the TFT is referred to as a pixel electrode while the other is referred to as an opposing electrode. When a switch 2015 is turned on, the corrected potential controlled by the voltage changer 2010 is applied to the opposing electrode. Since the EL driver potential applied to the pixel electrode is constant, a current is caused to flow through the EL element according to the corrected potential. Consequently, the corrected potential is controlled to enable the EL element 2003 to emit light at the desired luminance.

The corrected potential applied by the voltage changer 2010 is determined as described below.

First, a sensor 2011 obtains an analog signal representing information on surroundings, and an analog-to-digital (A/D) converter 2012 converts the obtained analog signal into a digital signal, which is inputted to a central processing unit (CPU) 2013. The CPU 2013 converts, on the basis of comparison data set in advance, the inputted digital signal into a correction signal for correcting the luminance of the EL element. The correction signal converted by the CPU 2013 is inputted to a digital-to-analog (D/A) converter 2014 to take analog form again. The voltage changer 2010 is supplied with the thus-formed correction signal and applies to the EL element a predetermined corrected potential according to the correction signal.

A most essential feature of the present invention resides in that adjustment of the luminance of the EL element is enabled in the above-described manner by attaching the sensor 2011 to an active matrix EL display device and by changing the corrected potential with the voltage changer 2010 on the basis of a signal representing information on surroundings sensed by the sensor 2011. Thus, the luminance of the EL display device in the EL display using the above-described display system can be controlled based on information on surroundings.

Figure 2A:
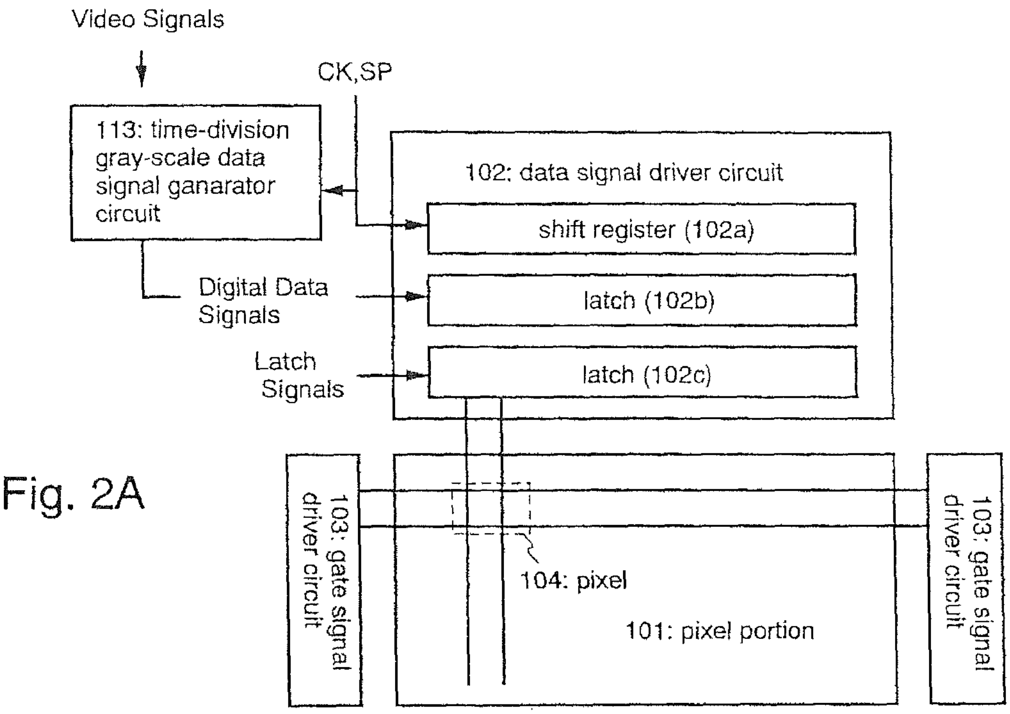
FIGS. 2A and 2B are diagrams showing the configuration of an EL display device.

FIG. 2A is a block diagram schematically showing the configuration of an active matrix EL display device in accordance with the present invention. The active matrix EL display device shown in FIG. 2A has TFTs formed on a substrate as components, a pixel portion 101, a data signal driver circuit 102 and gate signal driver circuits 103. The data signal driver circuit 102 and the gate signal driver circuits 103 are formed in the periphery of the pixel portion 101. The active matrix EL display device also has a time-division gray-scale data signal generator circuit 113 for forming digital data signals inputted to the pixel portion 101.

Figure 2B:
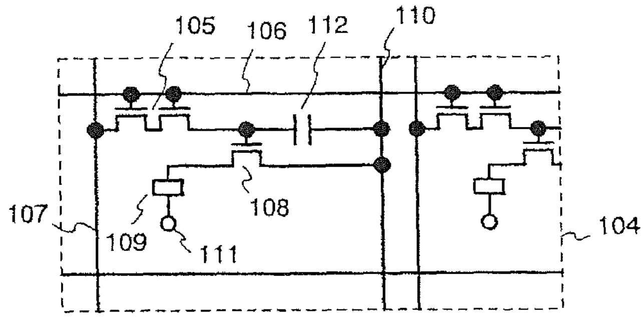

A plurality of pixels 104 are defined in the form of a matrix in the pixel portion 101. FIG. 2B is an enlarged diagram of each pixel 104. A switching TFT 105 and a current control TFT 108 are provided in each pixel. A source region of the switching TFT 105 is connected to a data wiring (source wiring) 107 for inputting a digital data signal.

A gate electrode of the current control TFT 108 is connected to a drain region of the switching TFT 105. A source region of the current control TFT 108 is connected to a power supply line 110, and a drain region of the current control TFT 108 is connected to an EL element 109. The EL element 109 has an anode (pixel electrode) connected to the current control TFT 108 and a cathode (opposing electrode) 111 provided on one side of an EL layer opposite from the anode. The cathode 111 is connected to a voltage changer.

The switching TFT 105 may be of an n-channel TFT or a p-channel TFT. In this embodiment mode, if the current control TFT 108 is an n-channel TFT, a connection structure is preferred in which the drain of the current control TFT 108 is connected to the cathode of the EL element 109. If the current control TFT 108 is a p-channel TFT, a connection structure is preferred in which the drain of the current control TFT 108 is connected to the anode of the EL element 109. However, in the case where the current control TFT 108 is an n-channel TFT, a structure may be adopted in which the source of the current control TFT 108 is connected to the anode of the EL element 109. Also, in the case where the current control TFT 108 is a p-channel TFT, a structure may be adopted in which the source of the current control TFT 108 is connected to the cathode of the EL element 109.

Further, a resistor (not shown) may be provided between the drain region of the current control TFT 108 and the anode (pixel electrode) of the EL element 109. If such a resistor is provided, it is possible to avoid the influence of variations in characteristics of the current control TFTs by controlling the currents supplied from the current control TFTs to the EL elements. A resistor element having a sufficiently large resistance value in comparison with the on-state resistance of the current control TFT 108 may suffice as the above-described resistor, and thus, the structure and the like of the resistor element is not specially limited as long as the resistance value is sufficiently large.

A capacitor 112 is provided to maintain a gate voltage for the current control TFT 108 when the switching TFT 105 is in the non-selected state (off state). The capacitor 112 is connected between the drain region of the switching TFT 105 and the power supply line 110.

The data signal driver circuit 102 basically has a shift register 102*a*, a latch 1 (102*b*) and a latch 2 (102*c*). Clock pulses (CK) and start pulses (SP) are inputted to the shift register 102*a*, digital data signals are inputted to the latch 1 (102*b*), and latch signals are inputted to the latch 2 (102*c*). Although only one data signal driver circuit 102 is provided in the example shown in FIG. 2A, two data signal driver circuits may be provided according to the present invention.

Each of the gate signal driver circuits 103 has a shift register (not shown), a buffer (not shown) and the like. Although two gate signal driver circuits 103 are provided in the example shown in FIG. 2A, only one gate signal driver circuit may be provided according to the present invention.

In the time-division gray-scale data signal generator circuit 113 (SPC: serial-to-parallel conversion circuit), an analog or digital video signal (a signal containing image information) is converted into a digital data signal for time-division gray-scale display. Simultaneously, timing pulses and the like necessary for time-division gray-scale display are generated to be inputted to the pixel portion.

The time-division gray-scale data signal generator circuit 113 includes means for dividing one frame period into a plurality of subframe periods corresponding to the number of gray-scale levels corresponding to n bits (n: integer equal to or larger than 2), means for selecting an addressing period and a sustaining period in each of the plurality of subframe periods, and means for setting sustaining periods Ts1 to Tsn such that $Ts1:Ts2:Ts3: \ldots : Ts(n-1):Ts(n)=2^0:2^{-1}:2^{-2}: \ldots :2^{-(n-2)}:2^{-(n-1)}$.

The time-division gray-scale data signal generator circuit 113 may be provided outside the EL display device of the present invention or may be formed integrally with the EL display device. In the case where the time-division gray-scale data signal generator circuit 113 is provided outside the EL display device, digital data signals formed outside the EL display device are inputted to the EL display device of the present invention.

In such a case, if the EL display device of the present invention is provided as a display in an electrical appliance, the EL display device and the time-division gray-scale data signal generator circuit in accordance with the present invention are included as separate components in the electrical appliance.

The time-division gray-scale data signal generator circuit 113 may also be provided in the form of an IC chip to be mounted on the EL display device of the present invention. In such a case, digital data signals formed in the IC chip are inputted to the EL display device of the present invention. The EL display device of the present invention having such an IC chip including the time-division gray-scale data signal generator circuit may be included as a component in an electrical appliance.

Finally, the time-division gray-scale data signal generator circuit 113 may be formed by TFTs on the substrate on which the pixel portion 101, the data signal driver circuit 102 and the gate signal driver circuit 103 are formed. In such a case, if only a video signal containing image information is inputted to the EL display device, the overall signal processing can be performed on the substrate. Needless to say, it is desirable that the time-division gray-scale data signal generator circuit should be formed of TFTs in which a poly-crystalline silicon film used in the present invention is formed as an active layer. The EL display device of the present invention having the time-division gray-scale data signal generator circuit formed in such a manner may be provided as a display in an electrical appliance. In such a case, the electrical appliance can be designed so as to be smaller in size since the time-division gray-scale data signal generator circuit is incorporated in the EL display device.

Time-division gray-scale display will next be described with reference to FIGS. 2A, 2B and 3. A case of $2^n$ gray-scale-level full-color display based on an n-bit digital driving method will be described by way of example.

Figure 3:
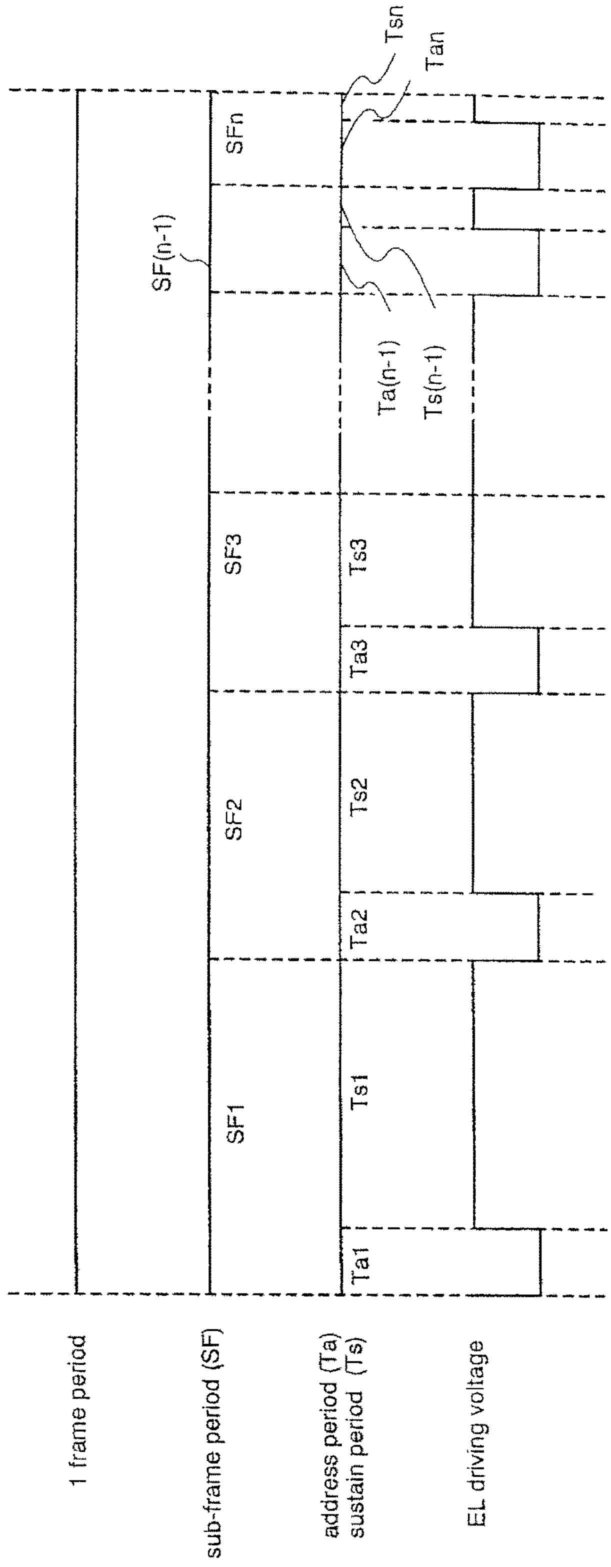
FIG. 3 is a diagram showing the operation of a time-division gray-scale display method.

First, one frame period is divided into n subframe periods (SF1 to SFn) as shown in FIG. 3. A time period in which all the pixels on the pixel portion form one image is called a frame period. In ordinary EL displays, the oscillation frequency is 60 Hz or higher, that is, sixty or more frame periods are set in one second, and sixty or more image frames are displayed in one second. If the number of image frames displayed in one second is smaller than 60, the visual perceptibility of image flicker is considerably increased.

Each of a plurality of periods defined as subdivisions of one frame period is called a subframe period. If the number of gray-scale levels is increased, the number by which one frame period is divided is increased and it is necessary for the driver circuits to be operated at higher frequencies.

One subframe period is divided into an addressing period (Ta) and a sustaining period (Ts). The addressing period is a time period required to input data to all the pixels in one subframe period. The sustaining period is a time period (also called a lighting period) during which the EL element is caused to emit light.

The addressing periods that belong respectively to the n subframe periods (SF1 to SFn) are equal in length to each other. The sustaining periods (Ts) that belong respectively to the subframe periods SF1 to SFn are represented by Ts1 to Tsn.

The lengths of the sustaining periods Ts1 to Tsn are set such that Ts1:Ts2:Ts3: . . . :Ts(n−1):Ts(n)=$2^0$:$2^{-1}$:$2^{-2}$: . . . :$2^{-(n-2)}$:$2^{-(n-1)}$. However, SF1 to SFn may appear in any order. Display at any of $2^n$ gray-scale levels can be performed by selecting a combination of these sustaining periods.

The current caused to flow through each EL element is determined by the difference between the corrected potential and the EL driving potential, and the luminance of the EL element is controlled by changing this potential difference. That is, the corrected potential may be controlled to control the luminance of the EL element.

The EL display device according to this embodiment mode will be described in more detail.

First, the power supply line 110 is maintained at the constant EL driving potential. A gate signal is then fed to the gate wiring 106 to turn on all the switching TFTs 105 connected to the gate wiring 106.

After the switching TFTs 105 have been turned on or simultaneously with turn-on of the switching TFTs 105, a digital data signal having an information value "0" or "1" is inputted to the source region of the switching TFT 105 in each pixel.

When the digital data signal is inputted to the source region of the switching TFT 105, the digital data signal is inputted to and held by the capacitor 112 connected to the gate electrode of the current control TFT 108. One addressing period is a time period in which digital data signals are inputted to all the pixels.

When the addressing period ends, the switching TFT 105 are turned off and the digital data signal held by the capacitor 112 is fed to the gate electrode of the current control TFT 108.

It is more desirable that the potential applied to the anode of the EL element is higher than the potential applied to the cathode. In this embodiment mode, the anode is connected as a pixel electrode to the power supply line while the cathode is connected to the voltage changer. Therefore, it is desirable that the EL driving potential be higher than the corrected potential.

Conversely, if the cathode is connected as a pixel electrode to the power supply line and the anode is connected to the voltage changer, it is desirable that the EL driving potential be lower than the corrected potential.

In the present invention, the corrected potential is controlled through the voltage changer on the basis of a signal representing an environmental condition sensed by the sensor. For example, the lightness in a space surrounding the EL display device is sensed by a photo diode. When the signal representing the sensed lightness is converted by the CPU into a correction signal for control of the luminance of the EL elements, this signal is inputted to the voltage changer and the corrected potential is changed according to the signal. The difference between the EL driving potential and the corrected potential is thereby changed, thus changing the luminance of the EL elements.

In this embodiment mode, when a digital data signal inputted to one pixel has an information value "0", the current control TFT 108 is set in the off state and the EL driving potential applied to the power supply line 110 is not applied to the anode (pixel electrode) of the EL element 109.

Conversely, when the digital data signal has an information value "1", the current control TFT 108 is set in the on state and the EL driving potential applied to the power supply line 110 is applied to the anode (pixel electrode) of the EL element 109.

Consequently, the EL element 109 in one pixel to which a digital data signal having an information value "0" is inputted does not emit light while the EL element 109 in one pixel to which a digital data signal having an information value "1" is inputted emits light. One sustaining period is a time period during which the EL element emits light.

Each EL element is caused to emit light (light a pixel) during some of the periods Ts1 to Tsn. It is assumed here that predetermined pixels have been lit during the period Tsn.

Then, another addressing period begins, data signals are inputted to all the pixels, and another sustaining period begins. This sustaining period is one of Ts1 to Ts(n−1). It is assumed here that predetermined pixels are lit during the period Ts(n−1).

The same operation is repeated with respect to the remaining (n−2) subframe periods. It is also assumed that sustaining periods Ts(n−2), Ts(n−3) . . . Ts1 are successively set, and that predetermined pixels are lit during each subframe period.

With the passage of n subframe periods, one frame period ends. At this time, the gray-scale level of one pixel is determined by adding up the sustaining periods during which the pixel has been lit, that is, the lengths of time periods during each of which the pixel is lit after a digital data signal having information value "1" has been inputted to the corresponding pixel. For example, if n=8 and the luminance when the pixel is lit through all the sustaining periods is 100%, a 75% luminance can be obtained by selecting the periods Ts1 and Ts2 and lighting the pixel during these periods, and a 16% luminance can be obtained by selecting the periods Ts3, Ts5, and Ts8.

In the present invention, a switch 2015 shown in FIG. 1 is off during each addressing period and is on during each sustaining period.

Figure 4:
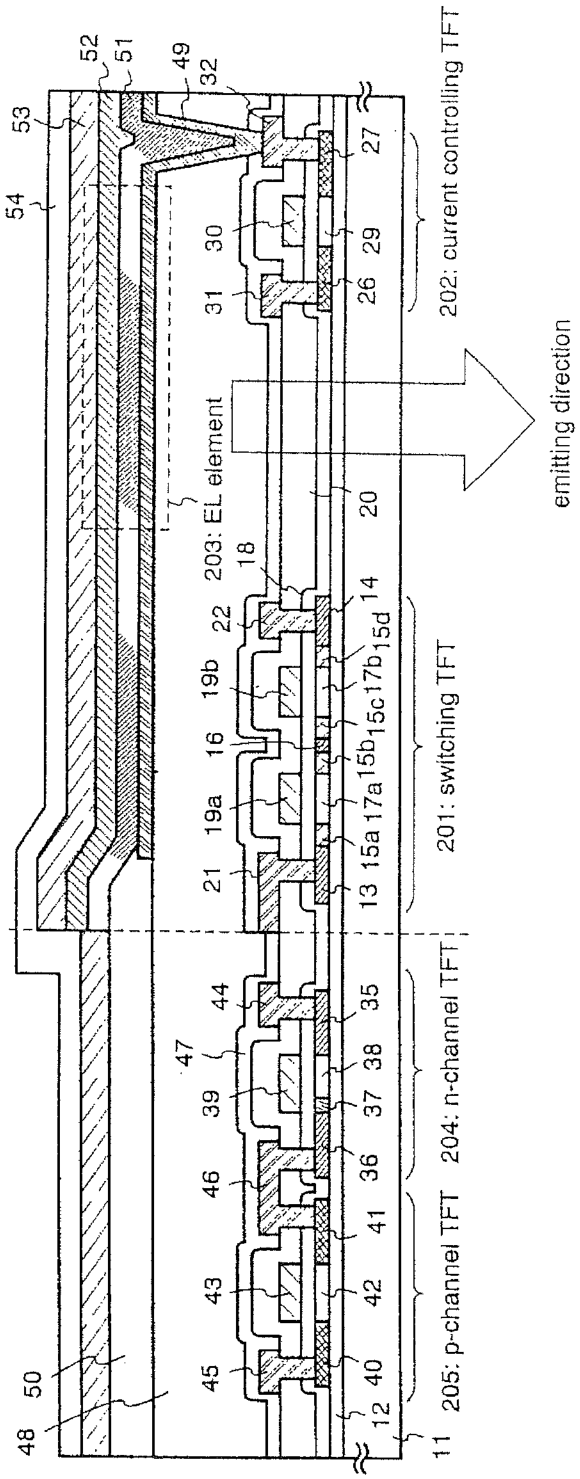
FIG. 4 is a cross-sectional view of the structure of the EL display device.

Next, FIG. 4 shows a schematic diagram of the structure of the active matrix EL display device of the present invention as seen in the cross section.

Referring to FIG. 4, a substrate is indicated by 11 and an insulating film is indicated by 12. The insulating film 12 is a base (hereinafter referred to as base film) on which components of the EL display device are fabricated. As substrate 11, a transparent substrate, typically a glass substrate, a quartz substrate, a glass-ceramic substrate, or a crystallized glass substrate may be used. However, it is necessary that the substrate be resistant to the maximum processing temperature during the manufacturing process.

The base film 12 is useful particularly in the case where a substrate containing mobile ions or an electrically conductive substrate is used. It is not necessary to form the base film 12 if a quartz substrate is used. The base film 12 may be an insulating film containing silicon. In this specification, "insulating film containing silicon" denotes an insulating film formed of a material composed of silicon and a predetermined proportion of oxygen and/or nitrogen to the amount of silicon, e.g., a silicon oxide film, a silicon nitride film, or a silicon oxynitride film (SiOxNy, where each of x and y is an arbitrary integer).

A switching TFT indicated by 201 is formed as an n-channel TFT. However, the switching TFT may alternatively be a p-channel TFT. A current control TFT indicated by 202 is formed as a p-channel TFT in the structure shown in FIG. 4. In this case, the drain of the current control TFT is connected to the anode of the EL element.

In the present invention, however, it is not necessary to limit the switching TFT to an n-channel TFT, and the current control TFT to a p-channel TFT. The relationship between the switching TFT and the current control TFT with respect to n-channel and p-channel types may be inverted or both the switching TFT and the current control TFT may be of the n-channel type or the p-channel type.

The switching TFT 201 is constituted of an active layer, including a source region 13, a drain region 14, lightly-doped domains (LDDs) 15*a* to 15*d*, a high-density-impurity region 16 and channel forming regions 17*a* and 17*b*, a gate insulating film 18, gate electrodes 19*a* and 19*b*, a first interlayer insulating film 20, a source line 21, and a drain line 22. The gate insulating film 18 or the first interlayer insulating film 20 may be provided in common for all TFTs on the substrate or may be differentiated with respect to circuits or devices.

The structure of the switching TFT 201 shown in FIG. 4 is such that the gate electrodes 19*a* and 19*b* are electrically connected, that is, it is a so-called double-gate structure. Needless to say, the structure of the switching TFT 201 may be a so-called multi-gate structure (including an active layer containing two or more channel forming regions connected in series), such as a triple-gate structure, other than the double-gate structure.

A multi-gate structure is highly effective in reducing the off current. If the off current of the switching TFT is limited to an adequately small value, the necessary capacitance of the capacitor 112 shown in FIG. 2B can be reduced. That is, the space occupied by the capacitor 112 can be reduced. Therefore, the multi-gate structure is also effective in increasing the effective light-emitting area of the EL element 109.

Further, in the switching TFT 201, each of the LDDs 15*a* to 15*d* is formed such that no LDD region is opposed to the gate electrode 19*a* or 19*b* with the gate insulating film 18 interposed therebetween. Such a structure is highly effective in reducing the off current. The length (width) of the LDD regions 15*a* to 15*d* may be set to 0.5 to 3.5 μm, typically 2.0 to 2.5 μm.

It is further preferable to provide offset regions (which are formed of a semiconductor layer having the same composition as the channel forming regions, and to which the gate voltage is not applied) between the channel forming regions and the LDD regions, because such offset regions are also effective in reducing the off current. In case of a multi-gate structure having two or more gate electrodes, the separation region 16 provided between the channel forming regions (a region containing the same content of the same impurity element as the source or drain region) is effective in reducing the off current.

The current control TFT 202 is constituted of a source region 26, a drain region 27, a channel forming region 29, gate insulating film 18, a gate electrode 30, the first interlayer insulating film 20, a source line 31, and a drain line 32. The gate electrode 30, shown as a single-gate structure, may alternatively be formed as a multi-gate structure.

As shown in FIG. 2B, the drain of the switching TFT is connected to the gate of the current control TFT. More specifically, the gate electrode 30 of the current control TFT 202 shown in FIG. 4 is electrically connected to the drain region 14 of the switching TFT 201 through the drain wiring 22 (also referred to as a connection wiring). Also, the source wiring 31 is connected to the power supply line 110 shown in FIG. 2B.

Also, from the viewpoint of increasing the current that can be caused to flow through the current control TFT 202, it is effective to increase the film thickness of the active layer of the current control TFT 202 (particularly the channel forming region) (preferably, 50 to 100 nm, and more preferably, 60 to 80 nm). Conversely, in reducing the off current of the switching TFT 201, it is effective to reduce the film thickness of the active layer (particularly the channel forming region) (preferably, 20 to 50 nm, and more preferably, 25 to 40 nm).

The TFT structure in one pixel has been described. Driver circuits are also formed simultaneously with the formation of the TFT structure. FIG. 4 also shows a complementary metal-oxide semiconductor (CMOS) circuit which is a basic unit for forming the driver circuits.

Referring to FIG. 4, a TFT constructed such that hot carrier injection is reduced while the operating speed is not reduced as much as possible is used as an n-channel TFT 204 in the CMOS circuit. The driver circuits referred to in this description correspond to the data signal driver circuit 102 and the gate signal driver circuit 103 shown in FIG. 2. Needless to say, other logical circuits (a level shifter, an A/D converter, signal dividing circuit and the like) can also be formed.

The active layer of the n-channel TFT 204 includes a source region 35, a drain region 36, an LDD region 37, and a channel forming region 38. The LDD region 37 is opposed to a gate electrode 39 with the gate insulating film 18 interposed therebetween. In this specification, this LDD region 37 is also referred to as a Lov region.

The LDD region 37 is formed only on the drain region side in the n-channel TFT 204 because of consideration given to maintaining the desired operating speed. It is not necessary to specially consider the off current of the n-channel TFT 204. More importance should be set on the operating speed. Therefore, it is desirable that the entire LDD region 37 be opposed to the gate electrode to minimize the resistance component. That is, a so-called offset should not be set.

The degradation of a p-channel TFT 205 in the CMOS circuit due to hot carrier injection is not considerable, and it is not necessary to specially provide an LDD region in the p-channel TFT 205. Therefore, the structure of the p-channel TFT 205 is such that the active layer thereof includes a source region 40, a drain region 41 and a channel forming region 42, and a gate insulating film 18 and a gate electrode 43 are formed on the active layer. Needless to say, it is possible to provide means for protection against hot carriers by providing the same LDD as that in the n-channel TFT 204.

The n-channel TFT 204 and the p-channel TFT 205 are covered with the first interlayer insulating film 20, and source wirings 44 and 45 are formed. The n-channel TFT 204 and the p-channel TFT 205 are connected to each other by drain wiring 46.

A first passivation film is formed as indicated by 47. The thickness of the passivation film 47 may be set to 10 nm to 1 μm (more preferably, 200 to 500 nm). As the material of the passivation film 47, an insulating film containing silicon (particularly preferably, silicon oxynitride film or silicon nitride film) may be formed. The passivation film 47 has a function of protecting the formed TFTs from alkali metals and water. Alkali metals, i.e., sodium, are contained in an EL layer finally formed above the TFTs. That is, the first passivation film 47 serves as a protective layer for preventing such alkali metals (mobile ions) from moving to the TFTs.

A second interlayer insulating film 48 is formed as a leveling film for leveling differences in level resulting from the formation of the TFTs. Preferably, the second interlayer insulating film 48 is a film of an organic resin, which may be polyimide, polyamide, an acrylic resin, benzocyclobutene (BCB), or the like. Such an organic resin film has the advantage of easily forming a level surface and having a small relative dielectric constant. Since the EL layer can be affected considerably easily by irregularities, it is desirable that the second interlayer insulating film should almost completely absorb differences in level due to the TFTs. It is also desirable to form a thick layer of a material having a small relative dielectric constant as the second interlayer insulating film, which is effective in reducing a parasitic capacitance formed between the gate and data wirings and the cathode of the EL element. Therefore, the film thickness is, preferably, 0.5 to 5 μm (more preferably, 1.5 to 2.5 μm).

A pixel electrode 49 (the anode of the EL element) formed of a transparent conductive film is provided. A contact hole is formed through the second interlayer insulating film 48 and the first passivation film 47, and the pixel electrode 49 is thereafter formed so as to connect to the drain wiring 32 of the current control TFT 202 in the formed contact hole. If the pixel electrode 49 and the drain region 27 are indirectly connected as shown in FIG. 4, alkali metals in the EL layer can be prevented from entering the active layer via the pixel electrode 49.

A third interlayer insulating film 50 formed of a silicon oxide film, a silicon oxynitride film or an organic resin film and having a thickness of 0.3 to 1 μm is provided over the pixel electrode 49. An opening is formed in the third interlayer insulating film 50 on the pixel electrode 49 by etching in such a manner that the opening edge is tapered. The taper angle is, preferably, 10 to 60° (more preferably, 30 to 50°).

The above-mentioned EL layer indicated by 51 is provided over the third interlayer insulating film 50. The EL layer 51 is provided in the form of a single layer or a multi-layer structure. The light-emitting efficiency is higher if the EL layer 51 is a multi-layer structure. Ordinarily, a hole injection layer, a hole transport layer, a light emitting layer, and an electron transport layer are formed in this order on the pixel electrode. However, the structure may alternatively be such that a hole transport layer, a light emitting layer and an electron transport layer, or a hole injection layer, a hole transport layer, a light emitting layer, an electron transport layer and an electron injection layer are formed. In the present invention, any of the well-known structures may be used and the EL layer may be doped with a fluorescent pigment or the like.

Organic EL materials used in the present invention may be selected from those disclosed in the following U.S. patents and Japanese Patent Applications Laid-open: U.S. Pat. Nos. 4,356,429; 4,539,507; 4,720,432; 4,769,292; 4,885,211; 4,950,950; 5,059,861; 5,047,687; 5,073,446; 5,059,862; 5,061,617; 5,151,629; 5,294,869; and 5,294,870; and Japanese Patent Application Laid-open Nos. Hei 10-189525, 8-241048, and 8-78159.

Multi-color display methods for EL display devices are generally represented by four methods: the method of forming three types of EL elements corresponding to red (R), green (G) and blue (B); the method of using a combination of an EL element for emitting white light and a color filter; the method of using a combination of an EL element for emitting blue or blue-green light and fluophors (layers of fluorescent color converting materials: CCM); and the method of superposing EL elements corresponding to RGB by using a transparent electrode as the cathode (opposing electrode).

The structure shown in FIG. 4 is an example according to the method of forming three types of EL elements corresponding to RGB. Although only one pixel is illustrated in FIG. 4, pixels of the same structure may be formed so as to be able to respectively display red, green and blue, thereby enabling multi-color display.

The present invention can be implemented regardless of the light-emitting methods, and each of the above-described methods can be used in the present invention. However, fluophors are lower in response speed than EL materials and entail the problem of afterglow. Therefore, the methods without using fluophors are preferred. It can also be said that it is desirable to avoid use of a color filter which causes a reduction in luminance.

A cathode 52 of the EL element is formed on the EL layer 51. To form the cathode 52, a material of a small work function containing magnesium (Mg), lithium (Li) or calcium (Ca) is used. Preferably, an electrode made of MgAg (a material obtained by mixing Mg and Ag in the ratio Mg:Ag=10:1) is used. Other examples of the cathode 52 are an MgAgAl electrode, an LiAl electrode and an LiFAl electrode.

It is desirable that the cathode 52 should be formed immediately after the formation of the EL layer 51 without exposing the EL layer to the atmosphere. This is because the condition of the interface between the cathode 52 and the EL layer 51 considerably influences the light-emitting efficiency of the EL element. In this specification, the light-emitting element formed of the pixel electrode (anode), the EL layer and the cathode is referred to as EL element.

Multi-layer structures each consisting of the EL layer 51 and the cathode 52 have to be formed separately from each other in each of the pixels. However, the EL layer 51 can be changed in quality extremely easily by water, and the ordinary photolithography technique cannot be used to form the multi-layer structures. Therefore, it is preferable to selectively form the multi-layer structures by vacuum vapor deposition, sputtering, or vapor deposition, such as plasma chemical vapor deposition (plasma CVD), with a physical mask such as a metal mask.

Incidentally, it may be possible that the cathode is formed by deposition, sputtering or vapor deposition such as plasma CVD after the EL layer is selectively formed by using ink jet method, screen printing method, spin coating method or the like.

A protective electrode 53 is provided to protect the cathode 52 from water and the like existing outside the EL display device and to be used as an electrode for connection of the pixels. To form the protective electrode 53, a low-resistance material containing aluminum (Al), copper (Cu) or silver (Ag) is preferably used. The protective electrode 53 can also be intended to dissipate heat developed from the EL layer. Also, it is advantageous to form the protective electrode 53 immediately after the formation of the EL layer 51 and the cathode 52 without exposing the formed layers to the atmosphere.

A second passivation film 54 is formed. The thickness of the second passivation film 54 may be set to 10 nm to 1 μm (more preferably, 200 to 500 nm). The second passivation film 54 is intended mainly to protect the EL layer 51 from water. It is also advantageous to use the second passivation film 54 for heat dissipation. However, since the EL layer is not resistant to heat as mentioned above, it is desirable to form the second passivation film 54 at a comparatively low temperature (preferably, in the range from room temperature to 120° C.). Therefore, plasma CVD, sputtering, vacuum vapor deposition, ion plating or solution coating (spin coating) is preferred as a method for forming the second passivation film 54.

The gist of the present invention is as follows. In the active matrix EL display device, a change in an environment is detected with the sensor, and the luminance of each EL element is controlled through control of the current flowing through the EL element based on information on the change in the environment. Therefore, the present invention is not limited to the EL display structure shown in FIG. 4. The structure shown in FIG. 4 is only included in one preferred embodiment mode of the present invention.

Embodiment 1

Figure 5:
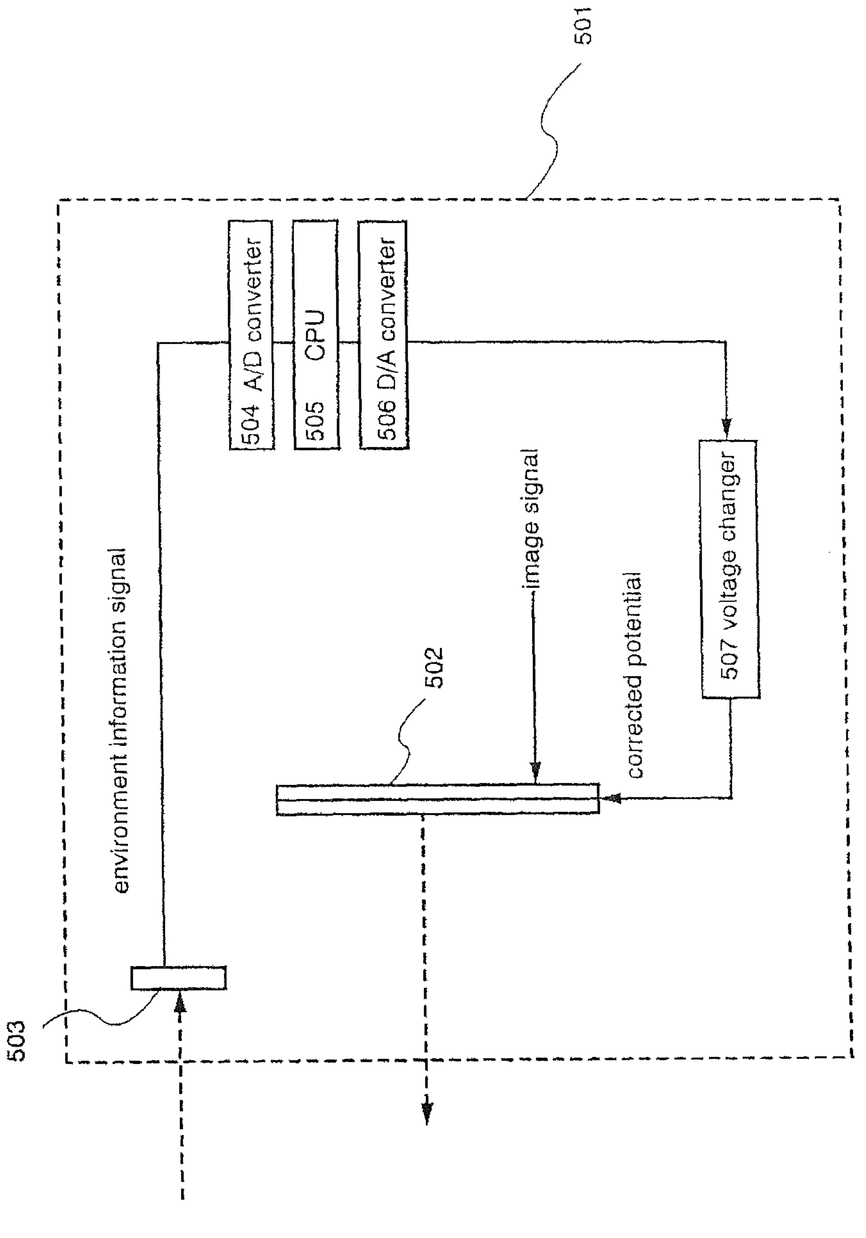
FIG. 5 is a diagram showing the configuration of an environment information responsive EL display system.

This embodiment relates to an EL display having a display system in which the lightness in an environment is detected with a light-receiving element, such as a photo diode, a CdS photoconductive cell (cadmium sulfide photoconductive cell), a charge-coupled device (CCD), or a CMOS sensor, to obtain an environment information signal, and the luminance of EL elements is controlled on the basis of the environment information signal. FIG. 5 schematically shows the configuration of the system. A lightness-responsive EL display 501 having an EL display device 502 mounted as a display portion in a notebook computer is illustrated. A photo diode 503 detects the lightness in an environment to obtain an environment lightness information signal. The environment information signal is obtained as an analog electrical signal by the photo diode 503 and is inputted to an A/D converter circuit 504. A digital environment information signal converted from the analog information signal by the A/D converter circuit 504 is inputted to a CPU 505. In the CPU 505, the inputted environmental information signal is converted into a correction signal for obtaining the desired lightness. The correction signal is inputted to a D/A converter circuit 506 to be converted into an analog correction signal. When the analog correction signal is inputted to a voltage changer 507, a corrected potential determined on the basis of the correction signal is applied to the EL elements.

The lightness-responsive EL display of this embodiment may include a light-receiving element, such as a CdS photoconductive cell, a CCD or a CMOS sensor, other than the photo diode, a sensor for obtaining living-body information on a user, and for converting the information into a living-body information signal, a speaker and/or a headset for outputting speech or musical sound, a video cassette recorder for supplying an image signal, and a computer.

Figure 6:
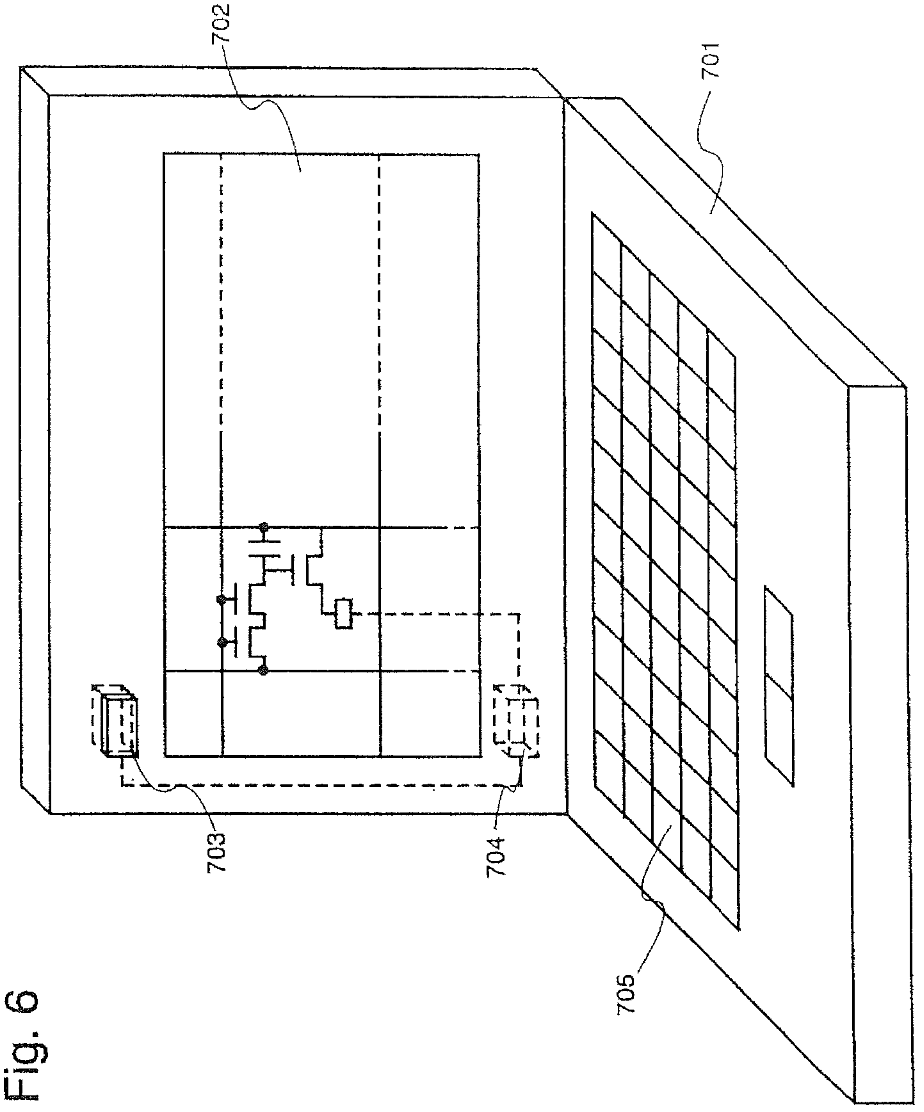
FIG. 6 is a diagram showing an external view of the environment information responsive EL display system.

FIG. 6 shows an external view of the lightness-responsive EL display of this embodiment, illustrated as a lightness-responsive EL display device 701, including a display portion 702, a photo diode 703, a voltage changer 704, a keyboard 705 and the like. In this embodiment, the EL display device is used as the display portion 702.

A certain number of photo diodes 703 for monitoring the lightness in an environment, not particularly limited, may be mounted in suitable portions of the EL display although only one photo diode 703 in a particular portion is illustrated in FIG. 6.

The operation and function of the lightness-responsive EL display of this embodiment will next be described with reference to FIG. 5. During ordinary use of the lightness-responsive EL display of this embodiment, an image signal is supplied from an external device to the EL display device. The external device is, for example, a personal computer, a portable information terminal, or a video cassette recorder. A user views an image displayed on the EL display device.

The lightness-responsive EL display 501 of this embodiment has the photo diode 503 for detecting the lightness in an environment as an environment information signal, and for converting the environment information signal into an electrical signal. The electrical signal obtained by the photo diode 503 is converted into a digital environment information signal by the A/D converter 504. The converted digital information signal is inputted to the CPU 505. The CPU 505 converts the inputted environment information signal into a correction signal for correcting the luminance of the EL element on the basis of comparison data set in advance. The correction signal obtained by the CPU 505 is inputted to the D/A converter 506 to be converted into an analog correction signal. When this analog correction signal is inputted to the voltage changer 507, the voltage changer 507 applies a predetermined corrected potential to the EL elements.

Thus, the potential difference between the EL driving potential and the corrected potential is controlled so that the luminance of the EL elements is changed based on the lightness in the environment. More specifically, the luminance of the EL elements is increased when the environment is bright, and is reduced when the environment is dark.

Figure 7:
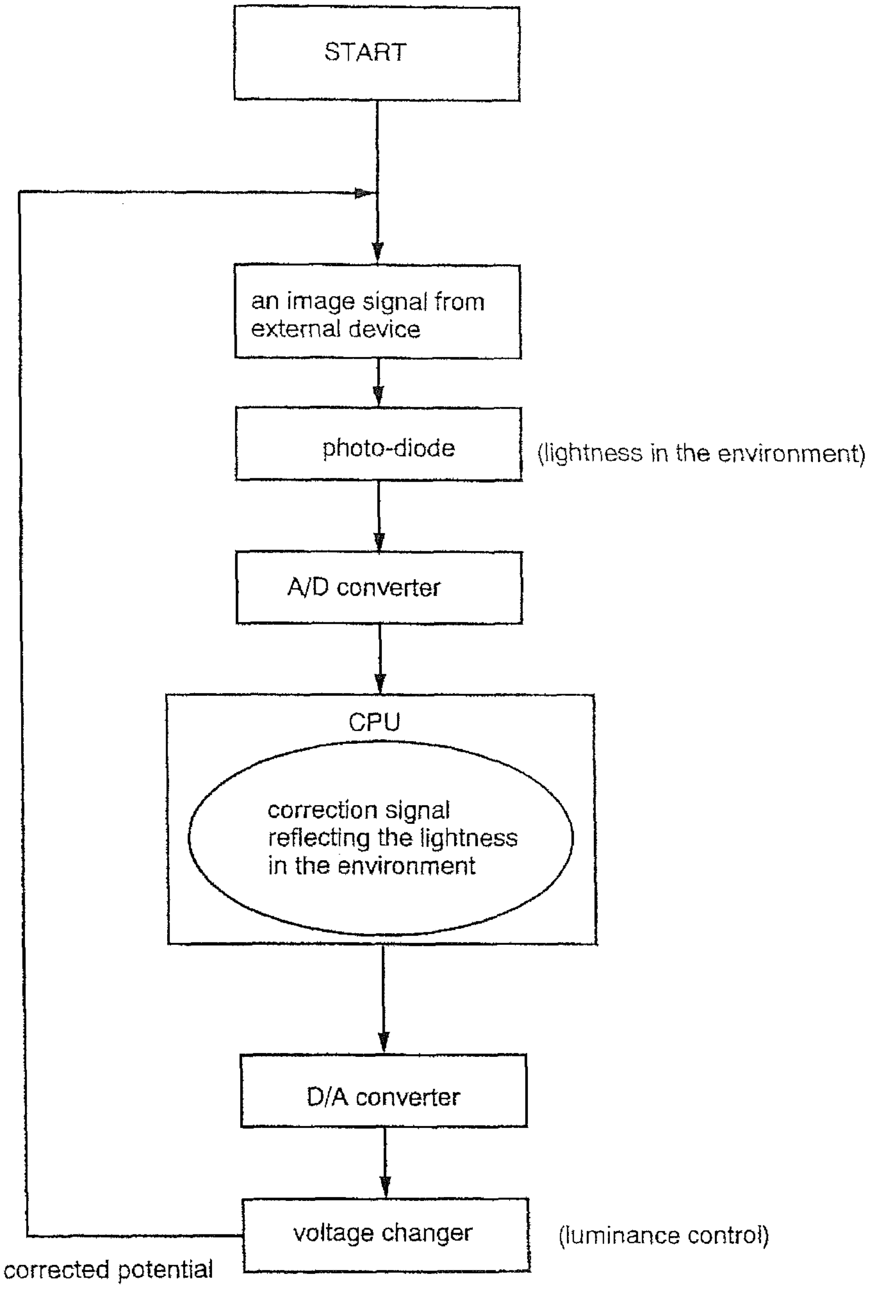
FIG. 7 is a flowchart showing the operation of the environment information responsive EL display system.

FIG. 7 shows a flowchart showing the operation of the lightness-responsive EL display of this embodiment. In the lightness-responsive EL display of this embodiment, an image signal from an external device (e.g., a personal computer or a video cassette recorder) is ordinarily supplied to the EL display device. Further, in this embodiment, the photo diode detects the lightness in the environment and outputs an environment information signal as an electrical signal to the A/D converter, and the A/D converter inputs the converted digital electrical signal to the CPU. Further, the CPU converts the inputted signal into a correction signal reflecting the lightness in the environment, and the D/A converter converts the correction signal into an analog correction signal. When the voltage changer is supplied with this correction signal, it applies the desired corrected potential to the EL elements, thereby controlling the luminance of the EL display device.

The above-described process is repeatedly performed.

This embodiment can be implemented as described above to enable luminance control of the EL display based on information on the lightness in an environment. Thus, it is possible to prevent excessive luminescence of the EL element and to limit degradation of the EL elements due to a large current flowing through the EL elements.

Figure 8:
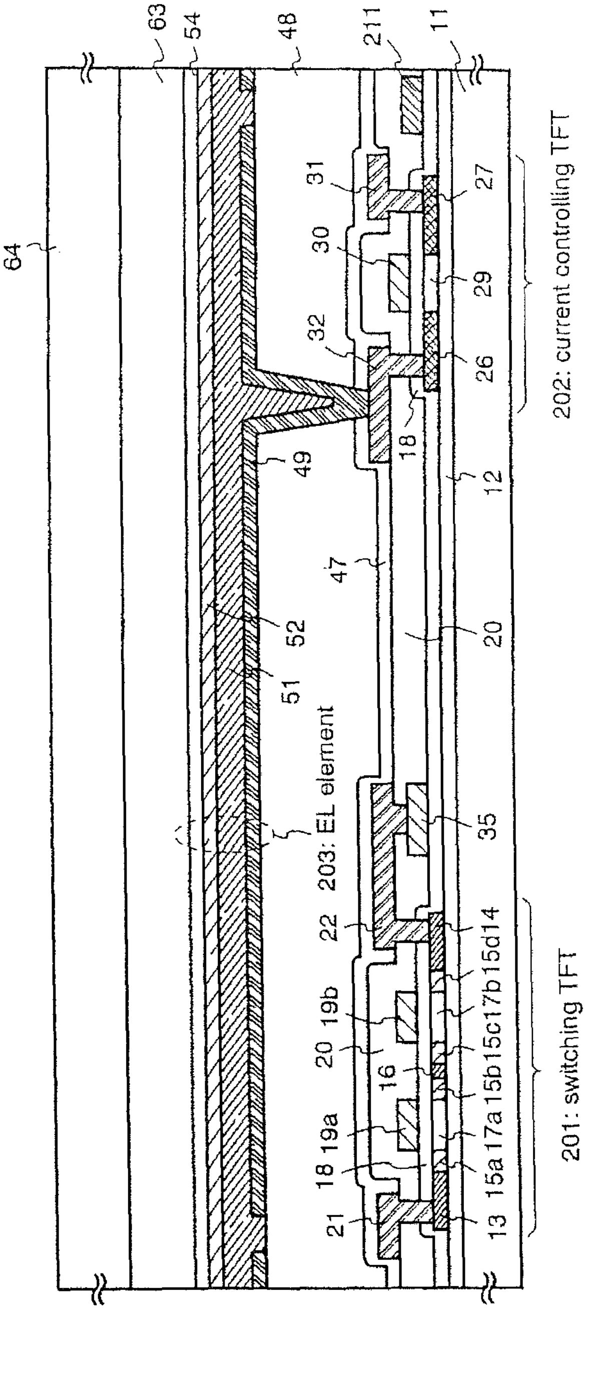
FIG. 8 is a cross-sectional view of a pixel portion of the EL display device.
Figure 9A:
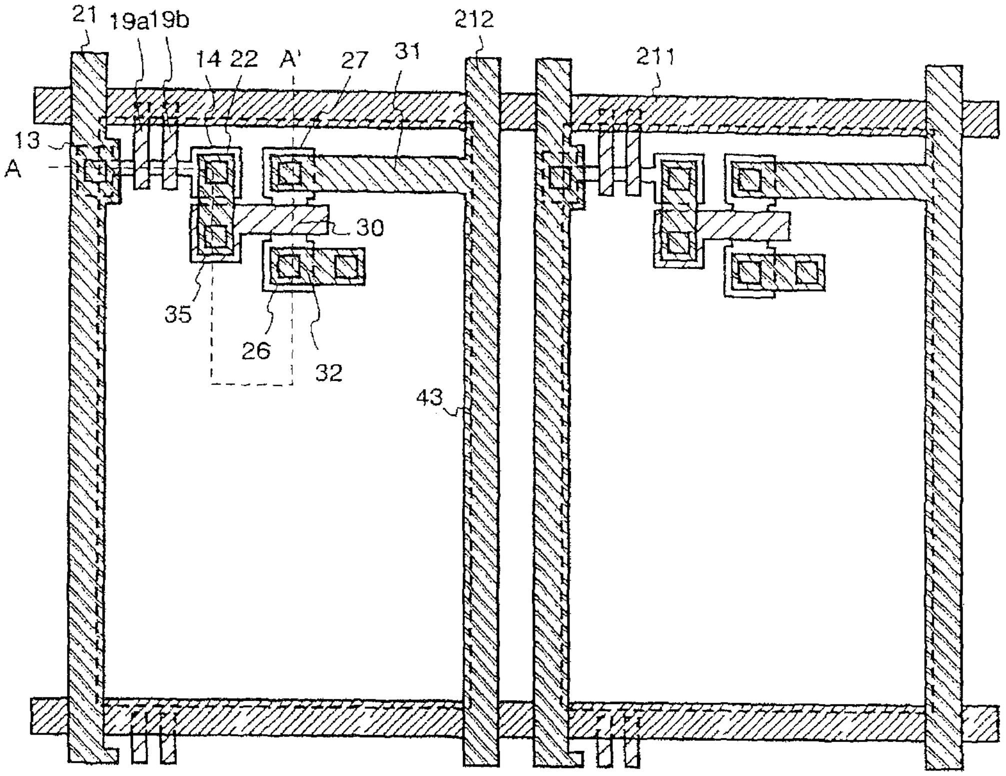
FIGS. 9A and 9B are a top view of a panel of the EL display device and a circuit diagram of the panel of the EL display device, respectively.
Figure 9B:
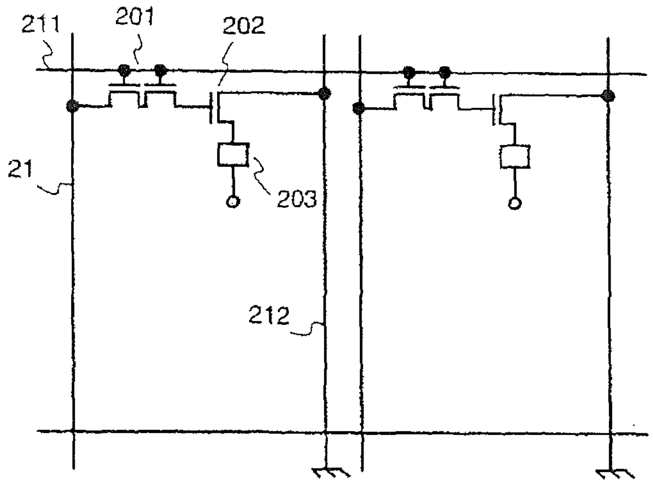

FIG. 8 is a cross-sectional view of a pixel portion of the EL display of this embodiment, FIG. 9A is a top view thereof, and FIG. 9B is a circuit diagram thereof. Actually, a plurality of pixels are arranged in the form of a matrix to form the pixel portion (image displaying portion). FIG. 8 corresponds to a sectional view taken along the line A-A' in FIG. 9A. Reference characters are used in common in FIGS. 8, 9A and 9B for cross reference. The two pixels shown in the top view of FIG. 9A are identical to each other in structure.

Referring to FIG. 8, a substrate is indicated by 11 and an insulating film is indicated by 12. The insulating film 12 is a base (hereinafter referred to as base film) on which components of the EL display are fabricated. As the substrate 11, a glass substrate, a glass-ceramic substrate, a quartz substrate, a silicon substrate, a ceramic substrate, a metal substrate or a plastic substrate (including a plastic film) may be used.

The base film 12 is useful particularly in the case where a substrate containing mobile ions or an electrically conductive substrate is used. It is not necessary to form the base film 12 if a quartz substrate is used. The base film 12 may be an insulating film containing silicon. In this specification, "insulating film containing silicon" denotes an insulating film formed of a material composed of silicon, oxygen and/or nitrogen in predetermined proportions, e.g., a silicon oxide film, a silicon nitride film, or a silicon oxynitride film (represented by SiOxNy).

The base film 12 may be formed so as to have a heat dissipation effect to dissipate heat developed by TFTs. This is effective in limiting the degradation of TFTs or the EL elements. To achieve such a heat dissipation effect, any of well-known materials may be used.

In this embodiment, two TFTs are formed in one pixel. That is, a switching TFT 201 is formed as an n-channel TFT, and a current control TFT 202 is formed as a p-channel TFT.

In the present invention, however, it is not necessary to limit the switching TFT to an n-channel TFT, and the current control TFT to a p-channel TFT. It is also possible to form the switching TFT as a p-channel TFT and the current control TFT as an n-channel TFT or to form both the switching TFT and the current control TFT as n-channel TFTs or p-channel TFTs.

The switching TFT 201 is constituted of an active layer, including a source region 13, a drain region 14, LDD regions 15*a* to 15*d*, a high-density-impurity region 16 and channel forming regions 17*a* and 17*b*, a gate insulating film 18, gate electrodes 19*a* and 19*b*, a first interlayer insulating film 20, a source wiring 21, and a drain wiring 22.

As shown in FIGS. 9A and 9B, the gate electrodes 19*a* and 19*b* are electrically connected by gate wiring 211 formed of a different material (a material having a resistance lower than that of the material of the gate electrodes 19*a* and 19*b*). That is, a so-called double-gate structure is formed. Needless to say, a so-called multi-gate structure (including an active layer containing two or more channel forming regions connected in series), such as a triple-gate structure, other than the double-gate structure, may be formed. A multi-gate structure is highly effective in reducing the off current. According to the present invention, the pixel switching device 201 is realized as a small-off-current switching device by forming a multi-gate structure.

The active layer is formed of a semiconductor film including a crystalline structure. That is, the active layer may be formed of a monocrystalline semiconductor film, a polycrystalline semiconductor film or a microcrystalline semiconductor film. The gate insulating film 18 may be formed of an insulating film containing silicon. Also, any conductive film can be used to form the gate electrode, the source wiring or the drain wiring.

Further, in the switching TFT 201, each of the LDDs 15*a* to 15*d* is formed such that no LDD region is opposed to the gate electrode 19*a* or 19*b* with the gate insulating film 18 interposed therebetween. Such a structure is highly effective in reducing the off current.

It is further preferable to provide offset regions (which are formed of a semiconductor layer having the same composition as the channel forming regions, and to which the gate voltage is not applied) between the channel forming regions and the LDD regions, because such offset regions are also effective in reducing the off current. In case of a multi-gate structure having two or more gate electrodes, the high-density-impurity region provided between the channel forming regions is effective in reducing the off current.

As described above, a TFT of a multi-gate structure is used as pixel switching device 201, thus realizing a switching device having an adequately small off current. Therefore, the gate voltage for the current control TFT can be maintained for a sufficiently long time (from the moment at which the pixel is selected to the moment at which the pixel is next selected) without a capacitor such as that shown in FIG. 2 of Japanese Patent Application Laid-open No. Hei 10-189252.

The current control TFT 202 is constituted of an active layer, including a source region 27, a drain region 26 and a channel forming region 29, the gate insulating film 18, a gate electrode 35, the first interlayer insulating film 20, source wiring 31, and drain wiring 32. The gate electrode 30, shown as a single-gate structure, may alternatively be formed as a multi-gate structure.

As shown in FIG. 8, the drain wiring 22 of the switching TFT 201 is connected to the gate electrode 30 of the current control TFT 202 through a gate wiring 35. More specifically, the gate electrode 30 of the current control TFT 202 is electrically connected to the drain region 14 of the switching TFT 201 through the drain wiring 22 (also referred to as a connection wiring). Also, the source wiring 31 is connected to the power supply line 212.

The current control TFT 202 is a device for controlling the current caused to flow through the EL element 203. If the degradation of the EL element is taken into a consideration, causing a large current to flow through the EL element is undesirable. Therefore, it is preferable to design the device such that the channel length (L) is longer to thereby prevent excess current through the current control TFT 202. Preferably, the current is limited to 0.5 to 2 μA (more preferably, 1 to 1.5 μA) per one pixel.

The length (width) of the LDD regions formed in the switching TFT 201 may be set to 0.5 to 3.5 μm, typically 2.0 to 2.5 μm.

Also, from the viewpoint of increasing the current that can be caused to flow through the current control TFT 202, it is effective to increase the film thickness of the active layer of the current control TFT 202 (particularly the channel forming region) (preferably, 50 to 100 nm, and more preferably, 60 to 80 nm). Conversely, in reducing the off current of the switching TFT 201, it is effective to reduce the film thickness of the active layer (particularly the channel forming region) (preferably, 20 to 50 nm, and more preferably, 25 to 40 nm).

A first passivation film is formed as indicated by 47. The thickness of the passivation film 47 may be set to 10 nm to 1 μm (more preferably, 200 to 500 nm). As the material of the passivation film 47, an insulating film containing silicon (in particular, preferably, silicon oxynitride film or silicon nitride film) may be formed.

A second interlayer insulating film (also referred so as a leveling film) 48 is formed on the first passivation film 47 so as to extend over the TFTs, leveling differences in level resulting from the formation of the TFTs. Preferably, the second interlayer insulating film 48 is a film of an organic resin, which may be polyimide, polyamide, an acrylic resin, benzocyclobutene (BCB), or the like. Needless to say, an inorganic film may alternatively be used if a sufficiently high leveling effect can be achieved.

It is very important to level differences in level due to the formation of the TFTs by using the second interlayer insulating film 48. An EL layer thereafter formed is so thin that there is a possibility of luminescence failure caused by a difference in level. Therefore, it is desirable that the surface on which a pixel electrode is formed should be suitably leveled to maximize the flatness of the EL layer.

A pixel electrode 49 (corresponding to the anode of the EL element) formed of a transparent conductive film is provided. A contact hole is formed through the second interlayer insulating film 48 and the first passivation film 47, and the pixel electrode 49 is thereafter formed so as to connect to the drain wiring 32 of the current control TFT 202 in the formed contact hole.

In this embodiment, a conductive film of a compound composed of indium oxide and tin oxide is used to form the pixel electrode. A small amount of gallium may be added to the conductive film compound.

The above-mentioned EL layer indicated by 51 is formed over the pixel electrode 49. In this embodiment, a polymeric organic material is applied by spin coating to form the EL layer 51. As this polymeric organic material, any well-known material can be used. While in this embodiment a single light-emitting layer is formed as the EL layer 51, a multi-layer structure may be formed by a combination of a light-emitting layer, a hole transport layer and an electron transport layer to achieve a higher light-emitting efficiency. However, if polymeric organic materials are laminated, it is desirable that they should be combined with a low-molecular organic material formed by deposition. If spin coating is performed, and if a base layer contains an organic material, there is a risk of the organic material being dissolved by an organic solvent in which an organic material for forming the EL layer is mixed to form a coating solution to be applied.

Example of typical polymeric organic materials which can be used in this embodiment are high-molecular materials such as poly-para-phenylene-vinylene (PPV) resins, polyvinyl carbazole (PVK) resins, and polyolefin resins. To form an electron transport layer, a light-emitting layer, a hole transport layer or a hole injection layer by some of such polymeric organic materials, a polymer precursor of the material may be applied and heated (backed) in a vacuum to be converted into the polymeric organic material.

More specifically, in light-emitting layers, cyano-polyphenylene-vinylene may be used for a red light-emitting layer, polyphenylene-vinylene for a green light-emitting layer, and polyphenylene-vinylene or polyalkylphenylene for a blue light-emitting layer. The film thickness may be set to 30 to 150 nm (preferably, 40 to 100 nm). Also, a polytetrahydrothiophenylphenylene, which is a polymer precursor, may be used for a hole transport layer to form polyphenylene-vinylene by being heated. The film thickness of this layer may be set to 30 to 100 nm (preferably, 40 to 80 nm).

It is also possible to perform emission of white light by using a polymeric organic material. As a technique for such an effect, those disclosed in Japanese Patent Application Laid-open Nos. Hei 8-96959, 7-220871, and 9-63770 may be cited. Polymeric organic materials are capable of easy color control based on adding a fluorescent pigment to a solution in which a host material is dissolved. Therefore, they are effective particularly in emitting white light.

An example of the formation of the EL element using polymeric organic materials has been described. However, low-molecular organic materials may also be used. Further, inorganic materials may be used to form an EL layer.

Examples of organic materials usable as EL layer materials according to the present invention have been described. The materials used in this embodiment are not limited to them.

Preferably, a dry atmosphere in which the content of water is minimized is used as a processing atmosphere when the EL layer 51 is formed, and it is desirable to form the EL layer in an inert gas. The EL layer can be easily degraded in the presence of water or oxygen. Therefore there is a need to eliminate such a cause as much as possible. For example, a dry nitrogen atmosphere, a dry argon atmosphere or the like is preferred. Preferably, to suitably perform processing in such an atmosphere, each of an application chamber and a baking chamber is placed in a clean booth filled with an inert gas and processing is performed in the inert gas atmosphere.

After the EL layer 51 has been formed in the above-described manner, a cathode electrode 52 formed of a light-shielding conductive film, a protective electrode (not shown) and a second passivation film 54 are formed. In this embodiment, a conductive film of MgAg is used to form the cathode 52. A silicon nitride film having a thickness of 10 nm to 1 μm (preferably, 200 to 500 nm) is formed as the second passivation film 54.

Since the EL layer is not resistant to heat as mentioned above, it is desirable to form the cathode 52 and the second passivation film 54 at a low temperature (preferably in the range of from room temperature to 120° C.). Therefore, plasma CVD, vacuum vapor deposition, or solution coating (spin coating) is preferred as a film forming method for forming the cathode 52 and the second passivation film 54.

The substrate with the components formed as described above is called an active-matrix substrate. An opposing substrate 64 is provided by being opposed to the active-matrix substrate. In this embodiment, a glass substrate is used as opposing substrate 64.

The active-matrix substrate and opposing substrate 64 are bonded to each other by a sealing material (not shown) to define an enclosed space 63. In this embodiment, the enclosed space 63 is filled with argon gas. Needless to say, a desiccant such barium oxide can be provided in the enclosed space 63.

Embodiment 2

The embodiments of the present invention are explained using FIGS. 10A to 12C. A method of simultaneous manufacturing of a pixel portion, and TFTs of a driver circuit portion formed in the periphery of the pixel portion, is explained here. Note that in order to simplify the explanation, a CMOS circuit is shown as a basic circuit for the driver circuits.

Figures 10A, 10B, 10C, 10D, 10E:
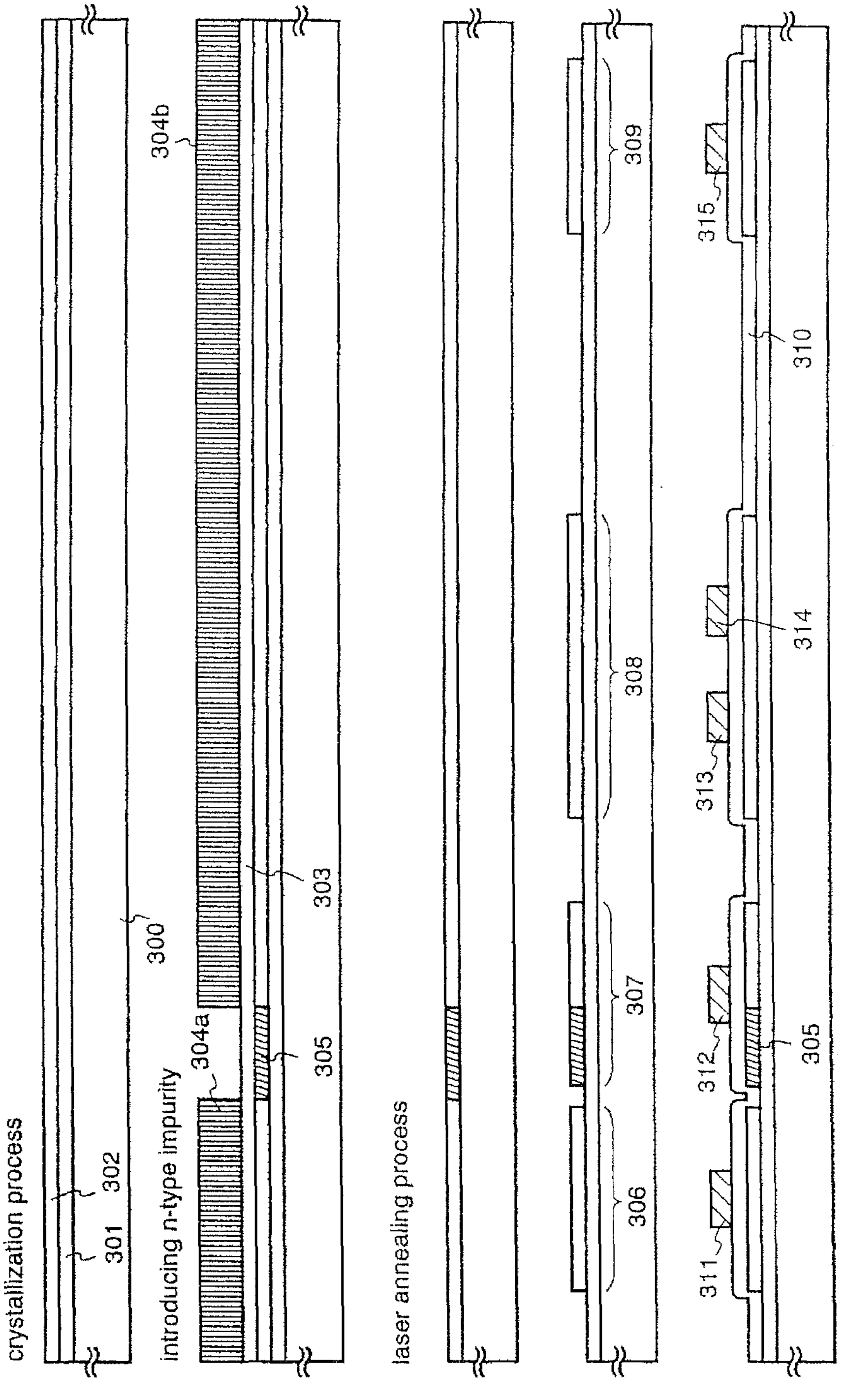
FIGS. 10A through 10E are diagrams of the process of fabricating the EL display device.

First, as shown in FIG. 10A, a base film 301 is formed with a 300 nm thickness on a glass substrate 300. As the base film 301, a silicon oxynitride film having a thickness of 100 nm is laminated on a silicon oxynitride film having a thickness of 200 nm in this embodiment. It is good to set the nitrogen concentration at between 10 and 25 wt % in the film contacting the glass substrate 300. Needless to say, elements can be formed on the quartz substrate without providing the base film.

Besides, as a part of the base film 301, it is effective to provide an insulating film made of a material similar to the first passivation film 47 shown in FIG. 4. The current controlling TFT is apt to generate heat since a large current is made to flow, and it is effective to provide an insulating film having a heat radiating effect at a place as close as possible.

Next, an amorphous silicon film (not shown in the figures) is formed with a thickness of 50 nm on the base film 301 by a known deposition method. Note that it is not necessary to limit this to the amorphous silicon film, and another film may be formed provided that it is a semiconductor film containing an amorphous structure (including a microcrystalline semiconductor film). In addition, a compound semiconductor film containing an amorphous structure, such as an amorphous silicon-germanium film, may also be used. Further, the film thickness may be made from 20 to 100 nm.

The amorphous silicon film is then crystallized by a known method, forming a crystalline silicon film (also referred to as a polycrystalline silicon film or a polycrystalline silicon film) 302. Thermal crystallization using an electric furnace, laser annealing crystallization using a laser, and lamp annealing crystallization using an infrared lamp exist as known crystallization methods. Crystallization is performed in this embodiment using an excimer laser light which uses XeCl gas.

Note that pulse emission type excimer laser light formed into a linear shape is used in this embodiment, but a rectangular shape may also be used, and continuous emission argon laser light and continuous emission excimer laser light can also be used.

In this embodiment, although the crystalline silicon film is used as the active layer of the TFT, it is also possible to use an amorphous silicon film. Further, it is possible to form the active layer of the switching TFT, in which there is a necessity to reduce the off current, by the amorphous silicon film, and to form the active layer of the current control TFT by the crystalline silicon film. Electric current flows with difficulty in the amorphous silicon film because the carrier mobility is low, and the off current does not easily flow. In other words, the most can be made of the advantages of both the amorphous silicon film, through which current does not flow easily, and the crystalline silicon film, through which current easily flows.

Next, as shown in FIG. 10B, a protective film 303 is formed on the crystalline silicon film 302 with a silicon oxide film having a thickness of 130 nm. This thickness may be chosen within the range of 100 to 200 nm (preferably between 130 and 170 nm). Furthermore, other films may also be used providing that they are insulating films containing silicon. The protective film 303 is formed so that the crystalline silicon film is not directly exposed to plasma during addition of an impurity, and so that it is possible to have delicate concentration control of the impurity.

Resist masks 304*a* and 304*b* are then formed on the protective film 303, and an impurity element which imparts n-type conductivity (hereafter referred to as an n-type impurity element) is added via the protective film 303. Note that elements residing in periodic table group 15 are generally used as the n-type impurity element, and typically phosphorous or arsenic can be used. Note that a plasma doping method is used, in which phosphine ($PH_3$) is plasma activated without separation of mass, and phosphorous is added at a concentration of $1\times10^{18}$ atoms/$cm^3$ in this embodiment. An ion implantation method, in which separation of mass is performed, may also be used, of course.

The dose amount is regulated so that the n-type impurity element is contained in n-type impurity regions 305 at a concentration of $2\times10^{16}$ to $5\times10^{19}$ atoms/$cm^3$ (typically between $5\times10^{17}$ and $5\times10^{18}$ atoms/$cm^3$).

Next, as shown in FIG. 10C, the protective film 303, resist masks 304*a* and 304*b* are removed, and an activation of the added periodic table group 15 elements is performed. A known technique of activation may be used as the means of activation, but activation is done in this embodiment by irradiation of excimer laser light. Of course, a pulse emission type excimer laser and a continuous emission type excimer laser may both, be used, and it is not necessary to place any limits on the use of excimer laser light. The goal is the activation of the added impurity element, and it is preferable that irradiation is performed at an energy level at which the crystalline silicon film does not melt. Note that the laser irradiation may also be performed with the protective film 303 in place.

The activation by heat treatment may also be performed along with activation of the impurity element by laser light. When activation is performed by heat treatment, considering the heat resistance of the substrate, it is good to perform heat treatment on the order of 450 to 550° C.

A boundary portion (connecting portion) with end portions of the n-type impurity region 305, namely region, in which the n-type impurity element is not added, on the periphery of the n-type impurity region 305, is not added, is delineated by this process. This means that, at the point when the TFTs are later completed, extremely good connections can be formed between LDD regions and channel forming regions.

Unnecessary portions of the crystalline silicon film are removed next, as shown in FIG. 10D, and island shape semiconductor films (hereafter referred to as active layers) 306 to 309 are formed.

Then, as shown in FIG. 10E, a gate insulating film 310 is formed, covering the active layers 306 to 309. An insulating film containing silicon and with a thickness of 10 to 200 nm, preferably between 50 and 150 nm, may be used as the gate insulating film 310. A single layer structure or a lamination structure may be used. A 110 nm thick silicon oxynitride film is used in this embodiment.

Thereafter, a conductive film having a thickness of 200 to 400 nm is formed and patterned to form gate electrodes 311 to 315. Respective end portions of these gate electrodes 311 to 315 may be tapered. In the present embodiment, the gate electrodes and wirings (hereinafter referred to as the gate wirings) electrically connected to the gate electrodes for providing lead wires are formed of different materials from each other. More specifically, the gate wirings are made of a material having a lower resistivity than the gate electrodes. Thus, a material enabling fine processing is used for the gate electrodes, while the gate wirings are formed of a material that can provide a smaller wiring resistance but is not suitable for fine processing. It is of course possible to form the gate electrodes and the gate wirings with the same material.

Although the gate electrode can be made of a single-layered conductive film, it is preferable to form a lamination film with two, three or more layers for the gate electrode if necessary. Any known conductive materials can be used for the gate electrode. It should be noted, however, that it is preferable to use such a material that enables fine processing, and more specifically, a material that can be patterned with a line width of 2 μm or less.

Typically, it is possible to use a film made of an element selected from tantalum (Ta), titanium (Ti), molybdenum (Mo), tungsten (W), chromium (Cr), and silicon (Si), a film of nitride of the above element (typically a tantalum nitride film, tungsten nitride film, or titanium nitride film), an alloy film of combination of the above elements (typically Mo—W alloy, Mo—Ta alloy), or a silicide film of the above element (typically a tungsten silicide film or titanium silicide film). Of course, the films may be used as a single layer or a laminate layer.

In this embodiment, a laminate film of a tantalum nitride (TaN) film having a thickness of 50 nm and a tantalum (Ta) film having a thickness of 350 nm is used. This may be formed by a sputtering method. When an inert gas of Xe, Ne or the like is added as a sputtering gas, film peeling due to stress can be prevented.

The gate electrode 312 is formed at this time so as to overlap and sandwich a portion of the n-type impurity regions 305 and the gate insulating film 310. This overlapping portion later becomes an LDD region overlapping the gate electrode. Further the gate electrodes 313 and 314 are seemed to two electrodes by a cross sectional view, practically, they are connected each other electrically.

Figures 11A, 11B, 11C, 11D:
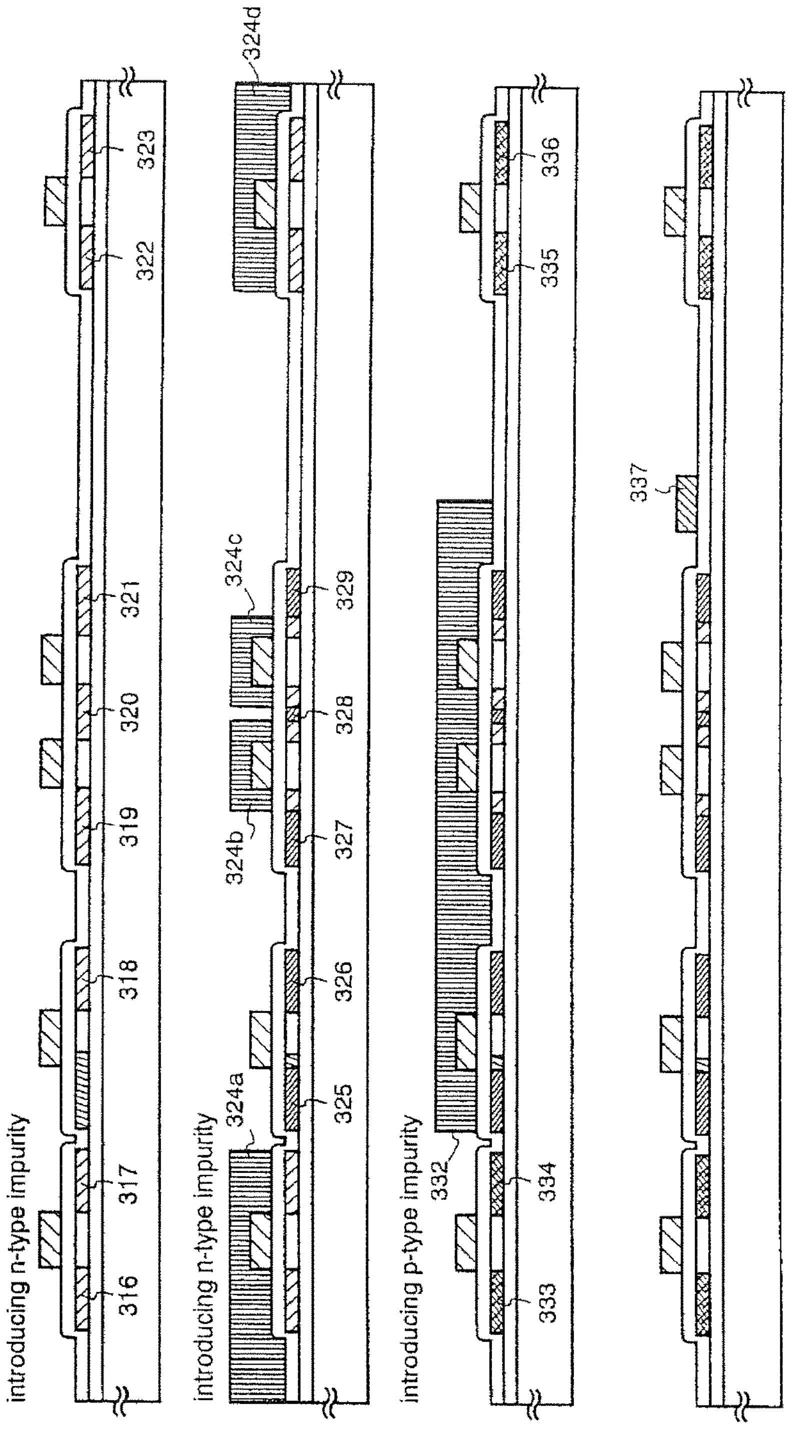
FIGS. 11A through 11D are diagrams of the process of fabricating the EL display device.

Next, an n-type impurity element (phosphorous in this embodiment) is added in a self-aligning manner with the gate electrodes 311 to 315 as masks, as shown in FIG. 11A. The addition is regulated so that phosphorous is added to impurity regions 316 to 323 thus formed at a concentration of 1/10 to 1/2 that of the n-type impurity region 305 (typically between 1/4 and 1/3). Specifically, a concentration of $1\times10^{16}$ to $5\times10^{18}$ atoms/cm$^3$ (typically $3\times10^{17}$ to $3\times10^{18}$ atoms/cm$^3$) is preferable.

Resist masks 324*a* to 324*d* are formed next, with a shape covering the gate electrodes etc., as shown in FIG. 11B, and an n-type impurity element (phosphorous is used in this embodiment) is added, forming impurity regions 325 to 329 containing high concentration of phosphorous. Ion doping using phosphine ($PH_3$) is also performed here, and is regulated so that the phosphorous concentration of these regions is from $1\times10^{20}$ to $1\times10^{21}$ atoms/cm$^3$ (typically between $2\times10^{20}$ and $5\times10^{21}$ atoms/cm$^3$).

A source region or a drain region of the n-channel type TFT is formed by this process, and in the switching TFT, a portion of the n-type impurity regions 319 to 321 formed by the process of FIG. 11A are remained. These remaining regions correspond to the LDD regions 15*a* to 15*d* of the switching TFT 201 in FIG. 4.

Next, as shown in FIG. 11C, the resist masks 324*a* to 324*d* are removed, and a new resist mask 332 is formed. A p-type impurity element (boron is used in this embodiment) is then added, forming impurity regions 333 to 336 containing boron at high concentration. Boron is added here to form impurity regions 333 to 336 at a concentration of $3\times10^{20}$ to $3\times10^{21}$ atoms/cm$^3$ (typically between $5\times10^{20}$ and $1\times10^{21}$ atoms/cm$^3$) by ion doping using diborane ($B_2H_6$).

Note that phosphorous has already been added to the impurity regions 333 to 336 at a concentration of $1\times10^{20}$ to $1\times10^{21}$ atoms/cm$^3$, but boron is added here at a concentration of at least three times more than that of the phosphorous. Therefore, the n-type impurity regions already formed completely invert to p-type, and function as p-type impurity regions.

Next, after removing the resist mask 332, the n-type and p-type impurity elements added to the active layer at respective concentrations are activated. Furnace annealing, laser annealing or lamp annealing can be used as a means of activation. In this embodiment, heat treatment is performed for 4 hours at 550° C. in a nitrogen atmosphere in an electric furnace.

At this time, it is critical to eliminate oxygen from the surrounding atmosphere as much as possible. This is because when even only a small amount of oxygen exists, an exposed surface of the gate electrode is oxidized, which results in an increased resistance and later makes it difficult to form an ohmic contact with the gate electrode. Accordingly, the oxygen concentration in the surrounding atmosphere for the activation process is set at 1 ppm or less, preferably at 0.1 ppm or less.

After the activation process is completed, the gate wiring 337 having a thickness of 300 nm is formed as shown in FIG. 11D. As a material for the gate wiring 337, a metal film containing aluminum (Al) or copper (Cu) as its main component (occupied 50 to 100% in the composition) can be used. The gate wiring 337 is arranged, as the gate wiring 211 shown in FIG. 9, so as to provide electrical connection for the gate electrodes 19*a* and 19*b* (corresponding to the gate electrodes 313 and 314 in FIG. 10E) of the switching TFT.

The above-described structure can allow the wiring resistance of the gate wiring to be significantly reduced, and therefore, an image display region (pixel portion) with a large area can be formed. More specifically, the pixel structure in accordance with the present embodiment is advantageous for realizing an EL display device having a display screen with a diagonal size of 10 inches or larger (or 30 inches or larger.)

Figure 12A:
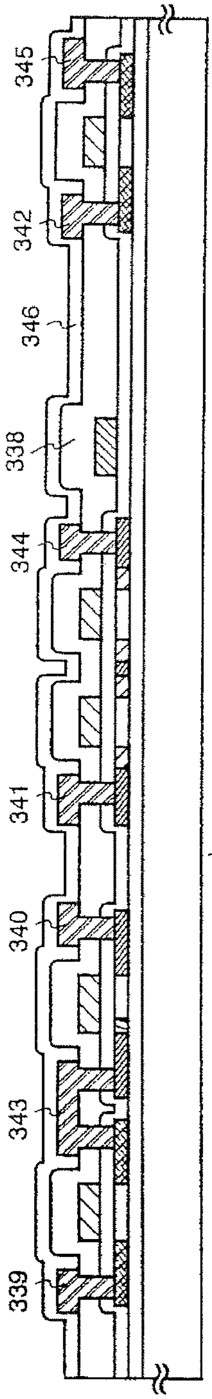
FIGS. 12A through 12C are diagrams of the process of fabricating the EL display device.

A first interlayer insulating film 338 is formed next, as shown in FIG. 12A. A single layer insulating film containing silicon is used as the first interlayer insulating film 338, while a lamination film, which is a combination of insulating film including two or more kinds of silicon, may be used. Further, a film thickness of between 400 nm and 1.5 μm may be used. A lamination structure of an 800 nm thick silicon oxide film on a 200 nm thick silicon oxynitride film is used in this embodiment.

In addition, heat treatment is performed for 1 to 12 hours at 300 to 450° C. in an atmosphere containing between 3 and 100% hydrogen, performing hydrogenation. This process is one of hydrogen termination of dangling bonds in the semiconductor film by hydrogen which is thermally activated. Plasma hydrogenation (using hydrogen activated by a plasma) may also be performed as another means of hydrogenation.

Note that the hydrogenation processing may also be inserted during the formation of the first interlayer insulating film 338. Namely, hydrogen processing may be performed as above after forming the 200 nm thick silicon oxynitride film, and then the remaining 800 nm thick silicon oxide film may be formed.

Next, a contact hole is formed in the first interlayer insulating film 338 and the gate insulating film 310, and source wiring lines 339 to 342 and drain wiring lines 343 to 345 are formed. In this embodiment, this electrode is made of a laminate film of three-layer structure in which a titanium film having a thickness of 100 nm, an aluminum film containing titanium and having a thickness of 300 nm, and a titanium film having a thickness of 150 nm are continuously formed by a sputtering method. Of course, other conductive films may be used.

A first passivation film 346 is formed next with a thickness of 50 to 500 nm (typically between 200 and 300 nm). A 300 nm thick silicon oxynitride film is used as the first passivation film 346 in this embodiment. This may also be substituted by a silicon nitride film. It is of course possible to use the same materials as those of the first passivation film 47 of FIG. 4.

Note that it is effective to perform plasma processing using a gas containing hydrogen such as $H_2$ or $NH_3$ etc. before the formation of the silicon oxynitride film. Hydrogen activated by this pre-process is supplied to the first interlayer insulating film 338, and the film quality of the first passivation film 346 is improved by performing heat treatment. At the same time, the hydrogen added to the first interlayer insulating film 338 diffuses to the lower side, and the active layers can be hydrogenated effectively.

Figure 12B:
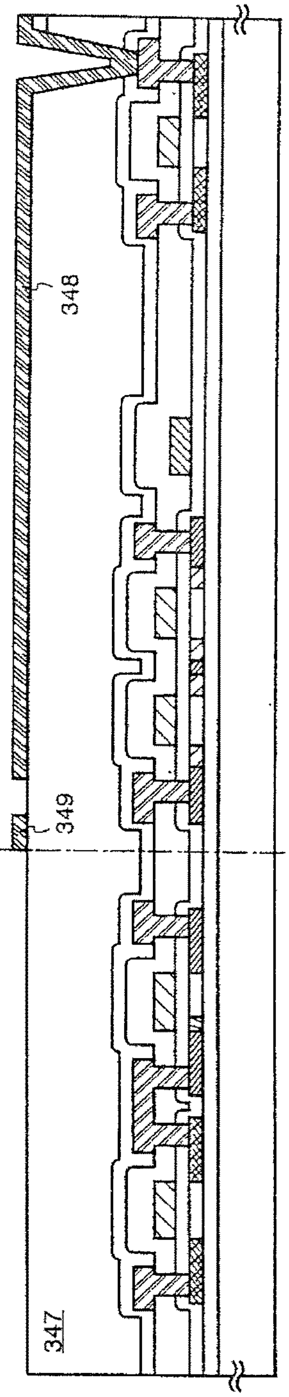

Next, as shown in FIG. 12B, a second interlayer insulating film 347 made of organic resin is formed. As the organic resin, it is possible to use polyimide, polyamide, acryl. BCB (benzocyclobutene) or the like. Especially, since the second interlayer insulating film 347 is primarily used for flattening, acryl excellent in flattening properties is preferable. In this embodiment, an acrylic film is formed to a thickness sufficient to flatten a stepped portion formed by TFTs. It is appropriate that the thickness is made 1 to 5 μm (more preferably, 2 to 4 μm).

Thereafter, a contact hole is formed in the second interlayer insulating film 347 and the first passivation film 346 and then the pixel electrode 348 connected to a drain wiring 345 electrically is formed. In this embodiment, the indium tin oxide film (ITO) is formed as a pixel electrode by forming to be 110 nm thick and patterned. A transparent conductive film can be used in which zinc oxide (ZnO) of 2-20% is mixed with indium tin oxide film also can be used. This pixel electrode is an anode of an EL element. The numeral 349 is an end portion of pixel electrode which is neighbored with the pixel electrode 348.

Next, the EL layer 350 and the cathode (MgAg electrode) 351 are formed using the vacuum deposition method without air release. The thickness of the EL layer 350 is 80-200 nm (100-120 nm typically); the cathode 351 thereof is 180-300 nm (200-250 nm typically).

In this process, an EL layer and cathode are sequentially formed for a pixel corresponding to red, a pixel corresponding to green, and a pixel corresponding to blue. However, since the EL layer is poor in tolerance to solutions, they must be independently formed for each color without using the photolithography technique. Thus, it is preferable to mask pixels except a desired one by the use of the metal mask, and selectively form an EL layer and cathode for the desired pixel.

In detail, a mask is first set for concealing all pixels except a pixel corresponding to red, and an EL layer and a cathode of red luminescence are selectively formed by the mask. Thereafter, a mask is set for concealing all pixels except a pixel corresponding to green, and an EL layer and a cathode of green luminescence are selectively formed by the mask. Thereafter, as above, a mask is set for concealing all pixels except a pixel corresponding to blue, and an EL layer and a cathode of blue luminescence are selectively formed by the mask. In this case, the different masks are used for the respective colors. Instead, the same mask may be used for them. Preferably, processing is performed without breaking the vacuum until the EL layer and the cathode are formed for all the pixels.

A known material can be used for the EL layer 350. Preferably, that is an organic material in consideration of driving voltage. For example, the EL layer 350 can be formed with a single-layer structure only consisting of above luminescent layer. When it is necessary, following layers can be provided, an electron injection layer, an electron transporting layer, a positive hole transporting layer, a positive hole injection layer and an electron blocking layer. In this embodiment, an example of using MgAg electrode as a cathode of an EL element 351, although other well-known material also can be used.

As a protective electrode 352, the conductive layer, which contains aluminum as a main component, can be used. The protective electrode 352 is formed using a vacuum deposition method with another mask when forming the EL layer and the cathode. Further, the protective electrode is formed continually without air release after forming the EL layer and the cathode.

Lastly, a second passivation film 353 made of a silicon nitride film is formed to be 300 nm thick. Practically, a protective electrode 352 fills the role of protecting the protect EL layer from water. Furthermore, the reliability of an EL element can be improved by forming the second passivation film 353.

Figure 12C:
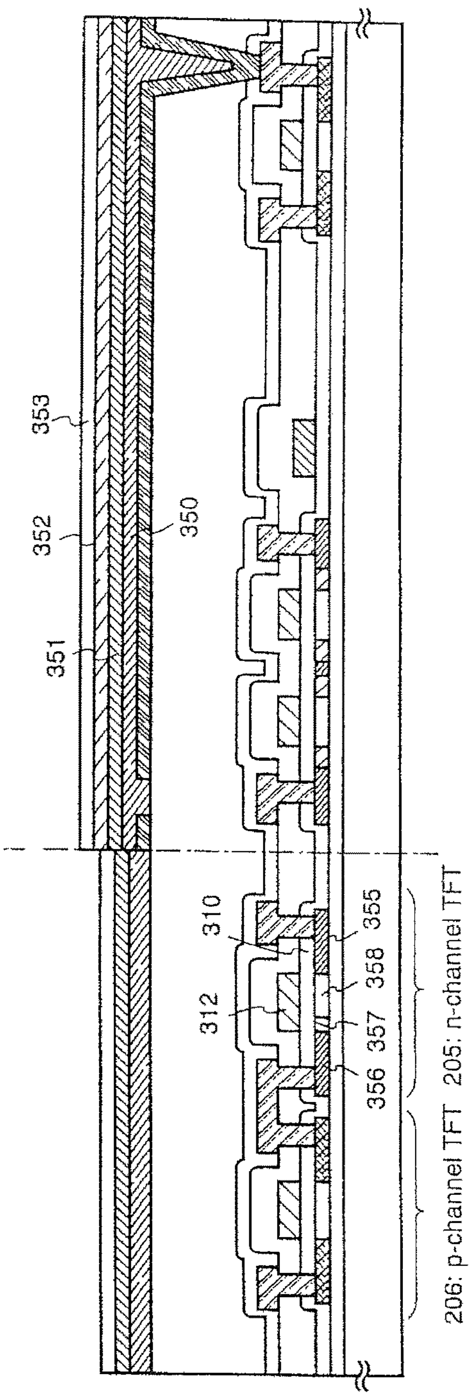

An active matrix EL display device constructed as shown in FIG. 12C is completed. In practice, preferably, the device is packaged (sealed) by a highly airtight protective film (laminate film, ultraviolet cured resin film, etc.) or a housing material such as a ceramic sealing can, in order not to be exposed to the air when completed as shown in FIG. 12C. In that situation, the reliability (life) of the EL layer is improved by making the inside of the housing material an inert atmosphere or by placing a hygroscopic material (for example, barium oxide) therein.

In this way, an active matrix EL display device having a structure as shown in FIG. 12C is completed. In the active matrix EL display device of this embodiment, a TFT having an optimum structure is disposed in not only the pixel portion but also the driving circuit portion, so that very high reliability is obtained and operation characteristics can also be improved.

First, a TFT having a structure to decrease hot carrier injection so as not to drop the operation speed thereof as much as possible is used as an n-channel TFT 205 of a CMOS circuit forming a driving circuit. Note that the driving circuit here includes a shift register, a buffer, a level shifter, a sampling circuit (sample and hold circuit) and the like. In the case where digital driving is made, a signal conversion circuit such as a D/A converter can also be included.

In the case of this embodiment, as shown in FIG. 12C, the active layer of the n-channel TFT 205 includes a source region 355, a drain region 356, an LDD region 357 and a channel formation region 358, and the LDD region 357 overlaps with the gate electrode 312, putting the gate insulating film 311 therebetween.

Consideration not to drop the operation speed is the reason why the LDD region is formed at only the drain region side. In this n-channel TFT 205, it is not necessary to pay much attention to an off current value, rather, it is better to give importance to an operation speed. Thus, it is desirable that the LDD region 357 is made to completely overlap with the gate electrode to decrease a resistance component to a minimum. That is, it is preferable to remove the so-called offset.

Besides, since deterioration due to hot carrier injection hardly becomes noticeable in the p-channel TFT 206 of the CMOS circuit, an LDD region does not need to be particularly provided. Of course, it is also possible to provide an LDD region similar to the n-channel TFT 205 to take a hot carrier countermeasure.

Note that, among the driving circuits, the sampling circuit is somewhat unique compared with the other sampling circuits, in that a large electric current flows in both directions in the channel forming region. Namely, the roles of the source region and the drain region are interchanged. In addition, it is necessary to control the value of the off current to be as small as possible, and with that in mind, it is preferable to use a TFT having functions which are on an intermediate level between the switching TFT and the current control TFT in the sampling circuit.

Figure 13:
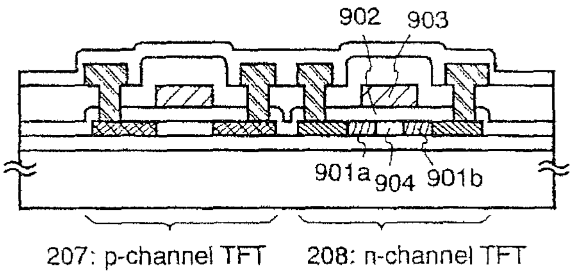
FIG. 13 is a diagram showing the structure of a sampling circuit of the EL display device.

Accordingly, it is preferable that the n-channel type TFT forming the sampling circuit arranges the TFT which has the structure shown in FIG. 13. As shown in FIG. 13, a portion of the LDD region 901*a* and 901*b* overlap with the gate electrode 903 sandwiching the gate insulating film 902. This effect is as same as the explanation as the current controlling TFT 202 which was stated above. The channel forming region 904 is sandwiched in the case of the sampling circuit, and it is a different point.

Practically, after completing the step of FIG. 12C, an active matrix substrate and opposite substrate is adhered by the sealant. In that situation, the reliability (life) of the EL layer is improved by making the inside of the airtight space sandwiched by the active matrix substrate and the opposite substrate an inert atmosphere or by placing a hygroscopic material (for example, barium oxide) therein.

Embodiment 3

Figure 14:
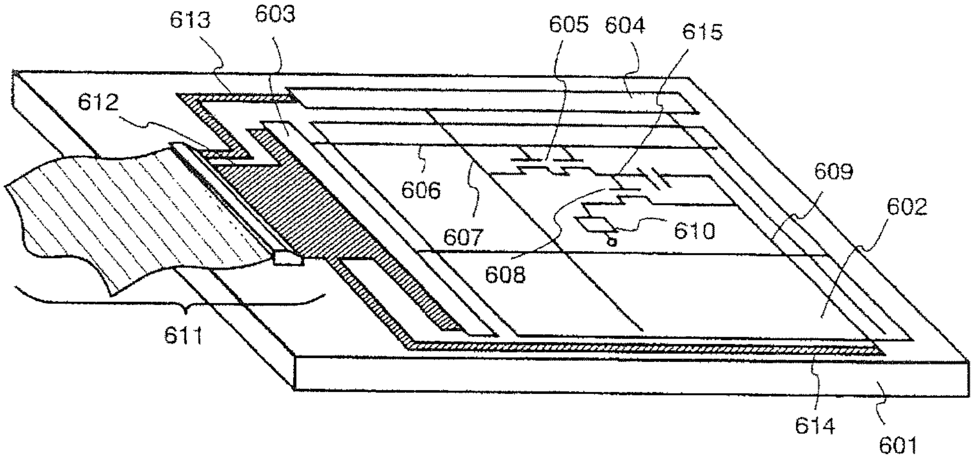
FIG. 14 is a perspective view of the EL display device.

The configuration of an active matrix EL display device of this embodiment will be described with reference to the perspective view of FIG. 14. The active matrix EL display device of this embodiment is constituted by a pixel portion 602, a gate driver circuit 603 and a source driver circuit 604 formed on a glass substrate 601. A switching TFT 605 in the pixel portion is an n-channel TFT and is placed at a point of intersection of gate wiring 606 connected to the gate driver circuit 603 and source wiring 607 connected to the source driver circuit 604. The drain of the switching TFT 605 is connected to the gate of a current control TFT 608.

The source of the current control TFT 608 is connected to a power supply line 609. A capacitor 615 is connected between the gate region of the current control TFT 608 and the power supply line 609. In the structure of this embodiment, an EL driving potential is fed to the power supply line 609. An EL element 610 is connected to the drain of the current control TFT 608. To the side of the EL element 610 opposite from the side connected to the current control TFT, a voltage changer (not shown) is connected to apply a corrected potential based on an environment information to the EL element.

A flexible printed circuit (FPC) 611 provided as external input/output terminals has input and output wirings (connection wirings) 612 and 613 for transmitting signals to the driver circuits, and input/output wiring 614 connected to the power supply line 609.

Figure 15A:
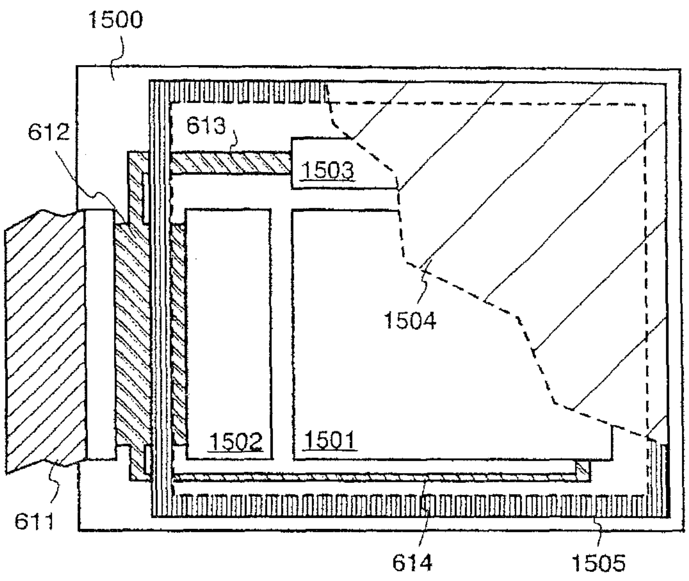
FIGS. 15A and 15B are a partially cutaway top view of the EL display device and a cross-sectional view of the EL display device shown in FIG. 15A, respectively.

An EL display device of this embodiment, including a housing member, will be described with reference to FIGS. 15A and 15B. Reference characters used in FIG. 14 will be referred to when necessary.

A pixel portion 1501, a data signal driver circuit 1502 and a gate signal driver circuit 1503 are formed on a substrate 1500. Wirings from the driver circuits extend to FPC 611 via input and output wirings 612 to 614 to be connected to an external device.

A housing member 1504 is provided so as to surround at least the pixel portion, preferably the driver circuits and the pixel portion. The housing member 1504 has such a shape as to have a recess having an internal size larger than the external size of the array of EL elements, or has a sheet-like shape. The housing member 1504 is fixed on the substrate 1500 by being bonded thereto by an adhesive 1505 in such a manner as to form an enclosed space in cooperation with the substrate 1500. The EL elements are thereby completely confined in the enclosed space in a sealing manner so as to be completely shut off from the external atmosphere. A plurality of housing members 1504 may be provided.

Preferably, the material of the housing member 1504 is an insulating material such as glass or a polymer. For example, it may be selected from amorphous glass (borosilicate glass, quartz, and the like), crystallized glass, ceramic glass, organic resins (acrylic resins, styrenes, polycarbonate resins, epoxy resins or the like), and silicone resins. Also, a ceramic material may be used. If the adhesive 1505 is an insulating material, a metallic material such as stainless steel may be used.

As adhesive 1505, an epoxy adhesive, an acrylate adhesive or the like may be used. Further, a thermosetting resin adhesive or photo-setting resin adhesive may be used as adhesive 1505. However, it is necessary that the adhesive material should inhibit permeation of oxygen or water as much as possible.

Preferably, a spacing 1506 between the housing member 1504 and the substrate 1500 is filled with an inert gas (argon, helium, nitrogen, or the like). Also, the spacing may be filled with an inert liquid (liquid fluorinated carbon represented by perfluoroalkane), which may be one used in the art disclosed in Japanese Patent Application Laid-open No. Hei 8-78519.

It is also advantageous to provide a desiccant in the spacing 1506. The desiccant may be one described in Japanese Patent Application Laid-Open No. Hei 9-148066. Typically, barium oxide may be used.

Figure 15B:
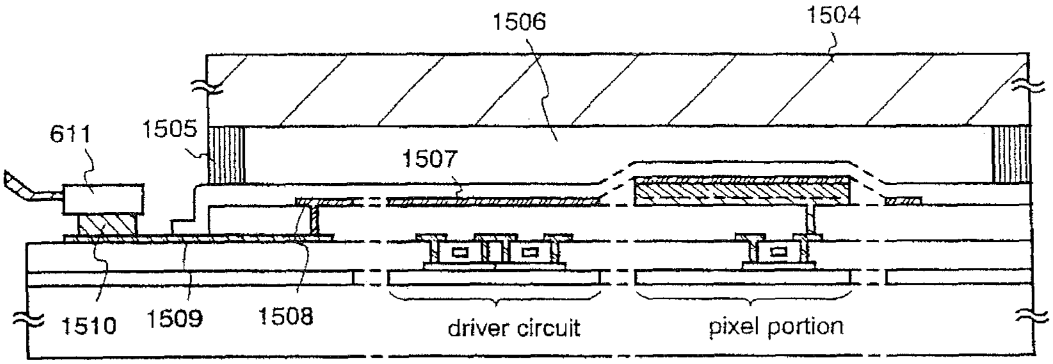

As shown in FIG. 15B, a plurality of pixels having discrete EL elements are provided in the pixel portion, and all of them have a protective electrode 1507 as a common electrode. Preferably, in this embodiment, an EL layer, a cathode (MgAg electrode) and a protective electrode are successively formed without being exposed to the atmosphere.

However, if the EL layer and the cathode may be formed by using the same mask member, and the protective electrode may be formed by using another mask member. Thus, the structure shown in FIG. 15B can be realized.

The EL layer and the cathode may be formed on the pixel portion alone and there is no need to form them over the driver circuits. There is no problem even if they are formed over the driver circuits. However, since the EL layer contains an alkali metal, it is desirable to prevent EL layer and cathode portions from being formed over the driver circuits.

The protective electrode 1507 is connected, in a region indicated by 1508, to input/output wiring 1509 through connection wiring 1508 formed of the same material as the pixel electrodes. The input/output wiring 1509 is a power supply line for supplying a predetermined voltage (ground potential in this embodiment, i.e., 0 V) to the protective electrode 1507. The input/output wiring 1509 is electrically connected to FPC 611 through an anisotropic conductive film 1510.

In the above-described state shown in FIG. 15, FPC 611 is connected to a terminal of an external device to enable display of an image on the pixel portion. In this specification, an article in which image display is enabled by connecting an FPC, i.e., an article in which an active-matrix substrate and an opposing substrate are attached to each other (with an FPC attached thereto), is defined as an EL display device.

The arrangement of this embodiment can be freely combined with that of either Embodiment 1 or 2.

Embodiment 4

Figure 16:
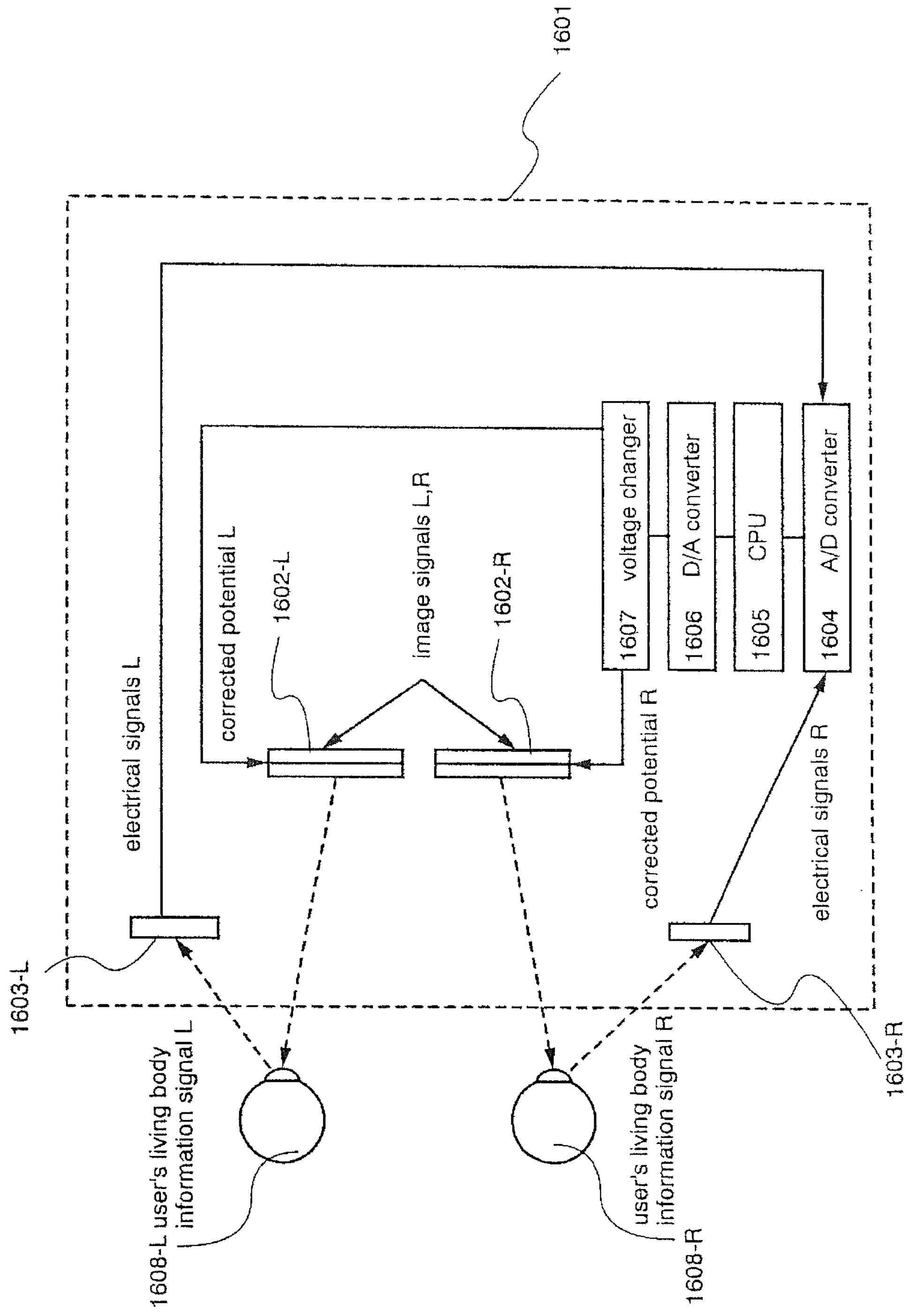
FIG. 16 is a diagram showing the configuration of a living-body information responsive EL display system.

This embodiment relates to an EL display having a display system in which living-body information on a user is detected and the luminance of EL elements is controlled based on the user's living-body information. FIG. 16 schematically shows the configuration of this system. A goggle-type EL display 1601 has an EL display device 1602-L and another EL display device 1602-R. In this specification, "-R" and "-L" which follow certain reference numerals denote components corresponding to the right eye and the left eye, respectively. CCD-L 1603-L and CCD-R 1603-R respectively form images of the left and right eyes of a user to obtain living-body information signal L and living-body information signal R. The living-body information signal L and the living-body information signal R are respectively inputted as electrical signals L and R to an A/D converter 1604. The electrical signals L and R are converted into digital electrical signals L and R by the A/D converter 1604. These signals are then inputted to a CPU 1605. The CPU 1605 converts the inputted digital electrical signals L and R into correction signals L and R corresponding to the degrees of congestion in the eyes of the user. The correction signals L and R are inputted to a D/A converter 1606 to be converted into digital correction signals L and R. When the digital correction signals L and R are inputted to a voltage changer 1607, the voltage changer 1607 applies corrected potentials L and R according to the digital correction signals L and R to the corresponding EL elements. The left eye and the right eye of the user are indicated by 1608-L and 1608-R, respectively.

The goggle-type EL display of this embodiment may have, as well as the CCDs used in this embodiment, sensors, including a CMOS sensor, for obtaining a signal representing living-body information on a user and for converting the living-body information signal into an electrical signal, a speaker and/or a headset for outputting speech or musical sound, a video cassette recorder for supplying an image signal, and a computer.

Figure 17:
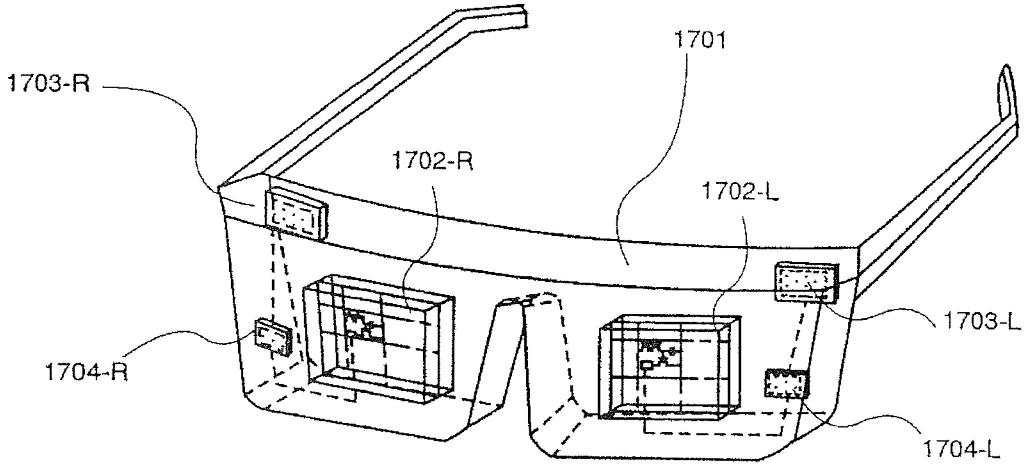
FIG. 17 is a perspective view of the living-body information-responsive EL display system.

FIG. 17 is a perspective view of a goggle-type EL display 1701 of this embodiment.

The goggle-type EL display 1701 has an EL display device L (1702-L), an EL display device R (1702-R), a CCD-L (1703-L), a CCD-R (1703-R), a voltage changer-L (1704-L), and a voltage changer R (1704-R). The goggle-type EL display 1701 also has other components (not shown in FIG. 17): an A/D converter, a CPU, and a D/A converter.

The placement of the CCD-L (1703-L) and the CCD-R (1703-R) for detecting the conditions of user's eyes is not limited to that illustrated in FIG. 17. A sensor, such as that described with respect to Embodiment 1, for detecting an environmental condition may also be added to the system of this embodiment.

The operation and functions of the goggle-type EL display of this embodiment will be described with reference to FIG. 16. During ordinary use of the goggle-type EL display of this embodiment, image signal L and image signal R are supplied from an external device to the EL display device 1602-L and the EL display device 1602-R. The external device is, for example, a personal computer, a portable information terminal, or a video cassette recorder. A user views images displayed on the EL display device 1602-L and the EL display device 1602-R.

The goggle-type EL display 1601 of this embodiment has the CCD-L 1603-L and CCD-R 1603-R for forming images of the user's eyes, for detecting living-body information from the image and for obtaining electrical signals representing the information. The electrical signals obtained from the images of the eyes are signals representing colors recognized in the white of the user's eyes excluding the pupil.

The signals respectively obtained as analog electrical signals by the CCD-L 1603-L and CCD-R 1603-R are inputted to the A/D converter 1604 to be converted into digital electrical signals. These digital electrical signals are inputted to the CPU 1605 to be converted into correction signals.

The CPU 1605 ascertains the degrees of congestion in the user's eyes from mixing of red information signals in white information signals obtained by recognition of the white of the eyes, and thereby determines whether or not the user feels fatigued in the eyes. In the CPU 1605, comparison data for adjusting the luminance of the EL elements with respect to the degree of user's eye fatigue is set in advance. Therefore, the CPU can convert the inputted signals into correction signals for controlling the luminance of the EL elements according to the degree of user's eye fatigue. The correction signals are converted by the D/A converter 1606 into analog correction signals, which are inputted to the voltage changer 1607.

Upon receiving the analog correction signals, the voltage changer 1607 applies predetermined corrected potentials to the EL elements, thereby controlling the luminance of the EL elements.

Figure 18:
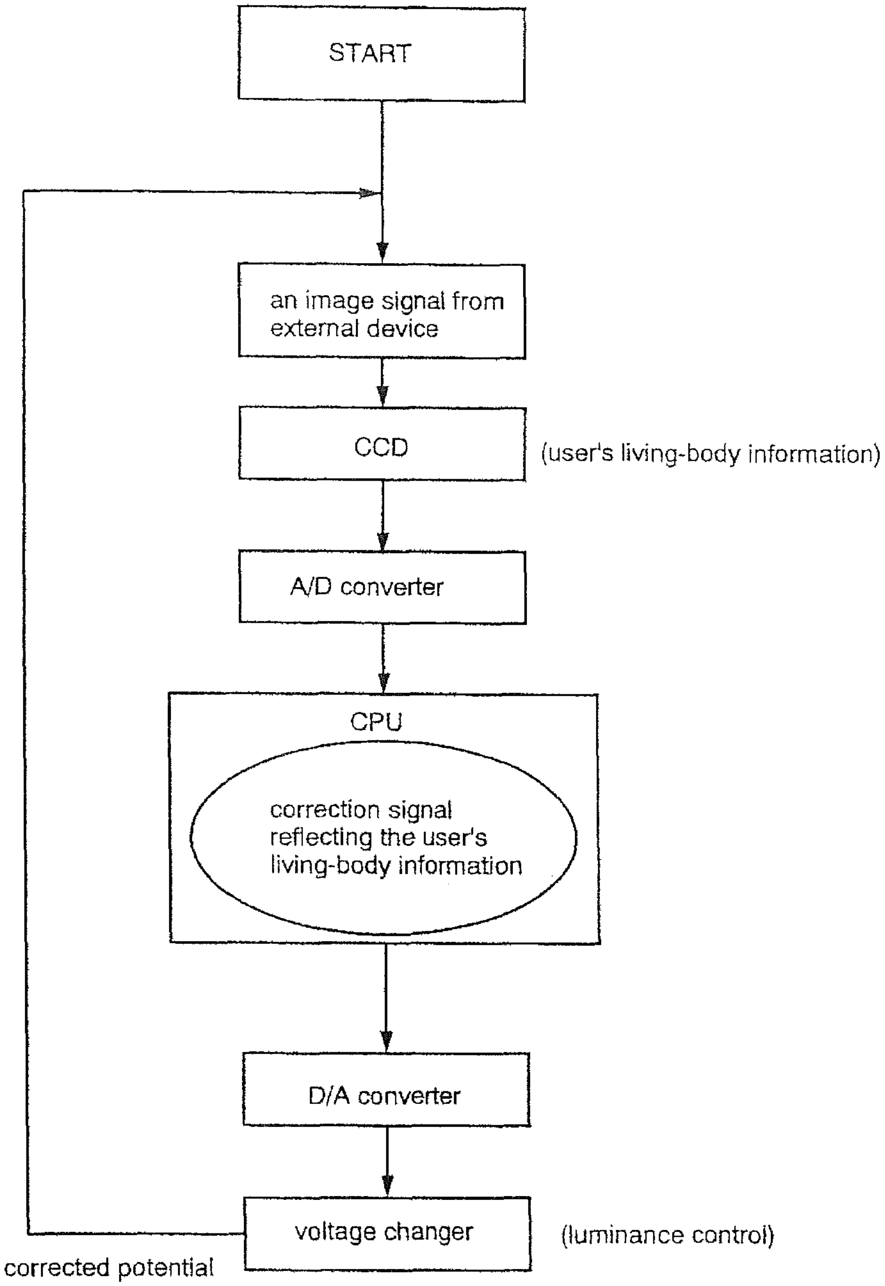
FIG. 18 is a flowchart of the operation of the living-body information-responsive EL display system.

FIG. 18 is a flowchart showing the operation of the goggle-type EL display of this embodiment. In the goggle-type EL display of this embodiment, image signals from an external device are supplied to the EL display devices. Simultaneously, user living-body information signals are obtained by the CCDs, and the electrical signals from the CCDs are inputted to the A/D converter. The electrical signals are converted by the A/D converter into digital signals, which are further converted by the CPU into correction signals reflecting the user living-body information. The correction signals are converted by the D/A converter into analog correction signals, which are inputted to the voltage changer. Corrected potentials are thereby applied to the EL elements to control the luminance of the EL elements.

The above-described process is repeatedly performed.

User living-body information about the user is not limited to the degree of congestion in the eyes. User living-body information can be obtained from various parts of the user, e.g., the head, eyes, ears, nose, and mouth.

As described above, when an abnormality of the degree of congestion in the user's eyes is recognized, the luminance of the EL display device can be reduced according to the abnormality. Thus, display can be performed responsively to an abnormality of the user's body, so that images can be displayed so as to be easy on the eyes.

The arrangement of this embodiment can be freely combined with any of the arrangements of Embodiment 1 to 3.

Embodiment 5

Figure 19A:
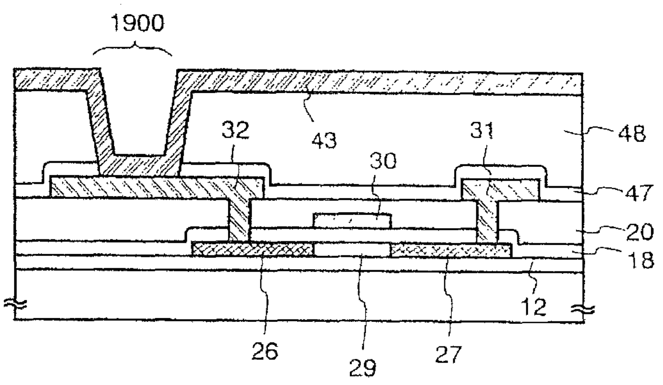
FIGS. 19A through 19C are cross-sectional views of the structure of the pixel portion of the EL display device.

A fabrication process for improving the contact structure in the pixel portion of Embodiment 1 described above with reference to FIG. 8 will be described below with reference to FIG. 19. Reference characters in FIG. 19 correspond to those in FIG. 8. A state where a pixel electrode (anode) 43 is formed as shown in FIG. 19A is obtained in the process described with respect to Embodiment 1.

Figure 19B:
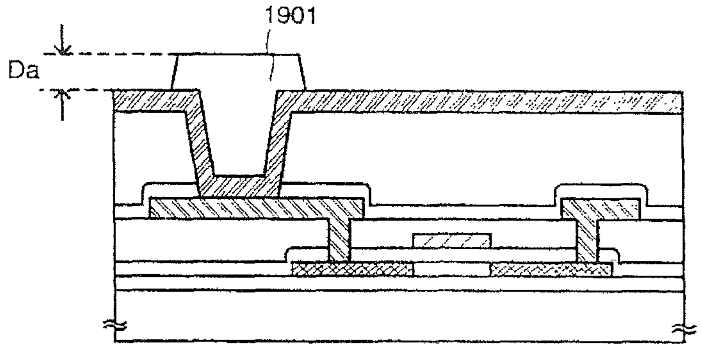

Next, a contact portion 1900 is filled with an acrylic resin to form a contact hole protective portion 1901, as shown in FIG. 19B.

In this embodiment, an acrylic resin is applied by spin coating to form a film, followed by exposure with a resist mask. A contact hole protective portion 1901, such as shown in FIG. 19B, is thereby formed by etching.

Figure 19C:
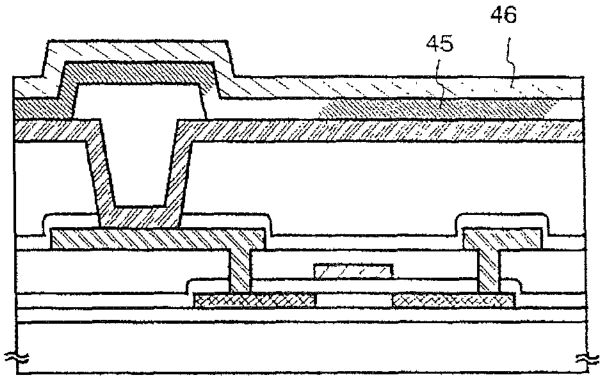

Preferably, the thickness of a portion in the contact hole protective portion 1901 protruding beyond the pixel electrode as seen in the cross section (a thickness Da shown in FIG. 19B) is set to 0.3 to 1 μm. After the contact hole protective portion 1901 has been formed, an EL layer 45 is formed as shown in FIG. 19C, and a cathode 46 is further formed. The EL layer 45 and the cathode 46 are formed by the method described in Embodiment 1.

An organic resin is preferred as the material of the contact hole protective portion 1901. Polyimide, polyamide, an acrylic resin, benzocyclobutene (BCB), or the like may be used. If such an organic resin is used, the viscosity may be set to $10^{-3}$ Pa·s to $10^{-1}$ Pa·s.

A structure such as shown in FIG. 19C is formed in the above-described manner, thereby solving the problem of short-circuiting caused between the pixel electrode 43 and the cathode 46 when the EL layer 45 is cut.

The arrangement of this embodiment can be freely combined with any of the arrangements of Embodiments 1 to 4.

Embodiment 6

The EL display device fabricated in accordance with the present invention is of the self-emission type, and thus exhibits more excellent recognizability of the displayed image in a light place as compared to the liquid crystal display device. Furthermore, the EL display device has a wider viewing angle. Accordingly, the EL display device can be applied to a display portion in various electronic devices. For example, in order to view a TV program or the like on a large-sized screen, the EL display device in accordance with the present invention can be used as a display portion of an EL display (i.e., a display in which an EL display device is installed into a frame) having a diagonal size of 30 inches or larger (typically 40 inches or larger.)

The EL display includes all kinds of displays to be used for displaying information, such as a display for a personal computer, a display for receiving a TV broadcasting program, a display for advertisement display. Moreover, the EL display device in accordance with the present invention can be used as a display portion of other various electric devices.

Such electronic devices include a video camera, a digital camera, a goggles-type display (head mount display), a car navigation system, a car audio equipment, a game machine, a portable information terminal (a mobile computer, a mobile phone, a portable game machine, an electronic book, or the like), an image reproduction apparatus including a recording medium (more specifically, an apparatus which can reproduce a recording medium such as a compact disc (CD), a laser disc (LD), a digital video disc (DVD), and includes a display for displaying the reproduced image), or the like. In particular, in the case of the portable information terminal, use of the EL display device is preferable, since the portable information terminal that is likely to be viewed from a tilted direction is often required to have a wide viewing angle. FIGS. 20A to 20E respectively show various specific examples of such electronic devices.

Figure 20A:
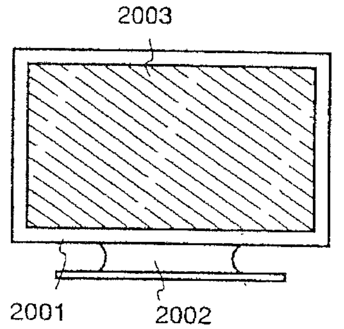
FIGS. 20A through 20E are diagrams showing examples of electric appliances.

FIG. 20A illustrates an EL display which includes a frame 2001, a support table 2002, a display portion 2003, or the like. The present invention is applicable to the display portion 2003. The EL display is of the self-emission type and therefore requires no back light. Thus, the display portion thereof can have a thickness thinner than that of the liquid crystal display device.

Figure 20B:
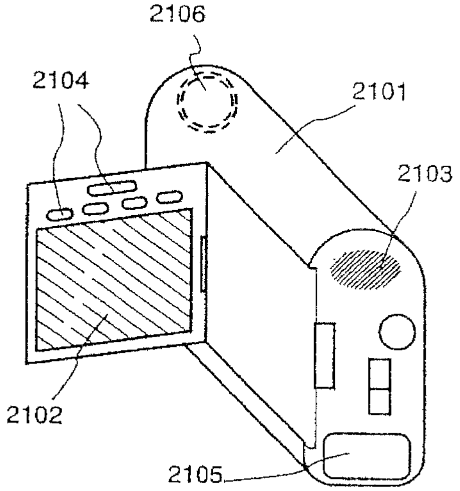

FIG. 20B illustrates a video camera which includes a main body 2101, a display portion 2102, an audio input portion 2103, operation switches 2104, a battery 2105, an image receiving portion 2106, or the like. The EL display device in accordance with the present invention can be used as the display portion 2102.

Figure 20C:
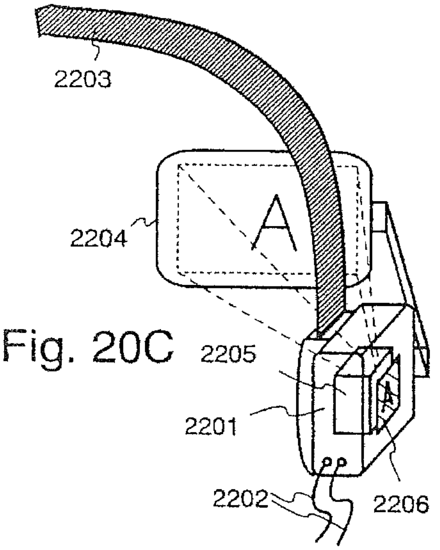

FIG. 20C illustrates a portion (the right-half piece) of an EL display of head mount type, which includes a main body 2201, signal cables 2202, a head mount band 2203, a display portion 2204, an optical system 2205, an EL display device 2206, or the like. The present invention is applicable to the EL display device 2206.

Figure 20D:
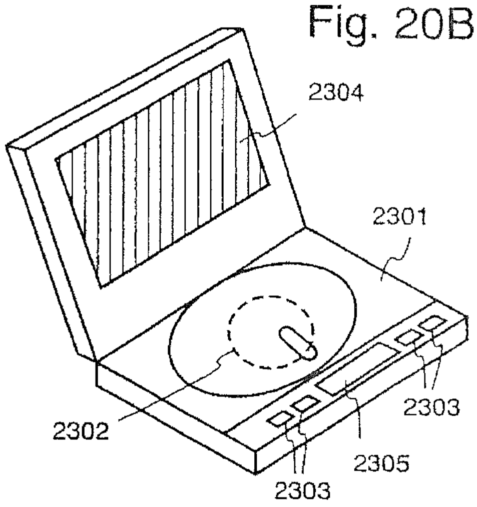

FIG. 20D illustrates an image reproduction apparatus including a recording medium (more specifically, a DVD reproduction apparatus), which includes a main body 2301, a recording medium (a CD, an LD, a DVD or the like) 2302, operation switches 2303, a display portion (a) 2304, another display portion (b) 2305, or the like. The display portion (a) is used mainly for displaying image information, while the display portion (b) is used mainly for displaying character information. The EL display device in accordance with the present invention can be used as these display portions (a) and (b). The image reproduction apparatus including a recording medium further includes a CD reproduction apparatus, a game machine or the like.

Figure 20E:
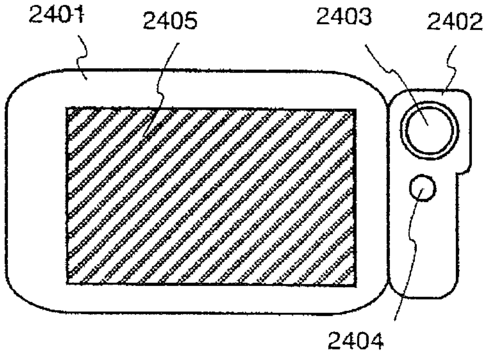

FIG. 20E illustrates a portable (mobile) computer which includes a main body 2401, a camera portion 2402, an image receiving portion 2403, operation switches 2404, a display portion 2405, or the like. The EL display device in accordance with the present invention can be used as the display portion 2405.

When the brighter luminance of light emitted from the EL material becomes available in the future, the EL display device in accordance with the present invention will be applicable to a front-type or rear-type projector in which light including output image information is enlarged by means of lenses or the like to be projected.

The aforementioned electronic devices are more likely to be used for display information distributed through a telecommunication path such as Internet, a CATV (cable television system), and in particular likely to display moving picture information. The EL display device is suitable for displaying moving pictures since the EL material can exhibit high response speed. However, if the contour between the pixels becomes unclear, the moving pictures as a whole cannot be clearly displayed. Since the EL display device in accordance with the present invention can make the contour between the pixels clear, it is significantly advantageous to apply the EL display device of the present invention to a display portion of the electronic devices.

A portion of the EL display device that is emitting light consumes power, so it is desirable to display information in such a manner that the light emitting portion therein becomes as small as possible. Accordingly, when the EL display device is applied to a display portion which mainly displays character information, e.g., a display portion of a portable information terminal, and more particular, a mobile phone or a car audio equipment, it is desirable to drive the EL display device so that the character information is formed by a light-emitting portion while a non-emission portion corresponds to the background.

Figure 21A:
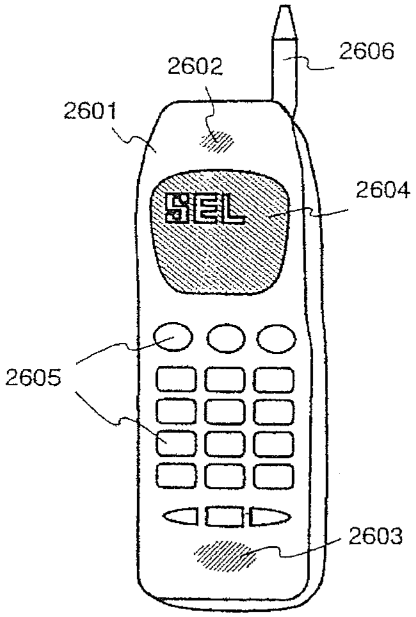
FIGS. 21A and 21B are diagrams showing examples of electric appliances.

With now reference to FIG. 21A, a mobile phone is illustrated, which includes a main body 2601, an audio output portion 2602, an audio input portion 2603, a display portion 2604, operation switches 2605, and an antenna 2606. The EL display device in accordance with the present invention can be used as the display portion 2604. The display portion 2604 can reduce power consumption of the mobile phone by displaying white-colored characters on a black-colored background.

Figure 21B:
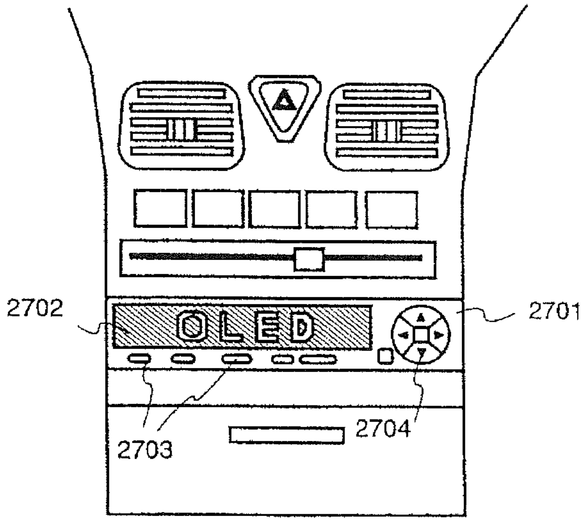

FIG. 21B illustrates a car audio equipment which includes a main body 2701, a display portion 2702, and operation switches 2703 and 2704. The EL display device in accordance with the present invention can be used as the display portion 2702. Although the car audio equipment of the mount type is shown in the present embodiment, the present invention is also applicable to an audio of the set type. The display portion 2702 can reduce power consumption by displaying white-colored characters on a black-colored background, which is particularly advantageous for the audio of the portable type.

As set forth above, the present invention can be applied variously to a wide range of electronic devices in all fields. The electronic device in the present embodiment can be obtained by freely combination of the structures in Embodiments 1 through 5.

In the information-responsive EL display system of the present invention, the luminance of the EL display device can be controlled on the basis of environment information and/or user living-body information obtained by a sensor such as a CCD. Thus, excess luminescence of the EL elements is limited and the degradation of the EL element due to a large current flowing through the EL element is limited. Also, the luminance is reduced in response to an abnormality of the user's eyes, so that images can be displayed so as to be easy on the eyes.

What is claimed is:

1. An electrical appliance comprising:

a first display device comprising a first EL element;

a second display device comprising a second EL element; and a sensor obtaining a living-body information signal of a user, wherein the living-body information signal can be used for controlling the first display device and the second display device, wherein the first display device forms a first image for a right-eye, wherein the second display device forms a second image for a left-eye, and wherein the living-body information signal represents any one of information on a degree of congestion in the user's eye, pulsation, blood pressure, body temperature, and an opening in an iris.

2. The electrical appliance according to claim 1, wherein the first EL element comprises a first EL layer provided between a first electrode and a second electrode, and wherein the first EL layer comprises a first light emitting layer.

3. The electrical appliance according to claim 1, further comprising:

an A/D converter; and a CPU, wherein the sensor inputs the living-body information signal as an electrical signal to the A/D converter, wherein the electrical signal is converted into a digital electrical signal by the A/D converter, and wherein the digital electrical signal is inputted to the CPU.

4. The electrical appliance according to claim 1, wherein the living-body information signal can be used for controlling luminance of the first display device and the second display device.

5. The electrical appliance according to claim 1, wherein the sensor is any one of a photo diode, a CdS photoconductive cell, charge-coupled devices, and CMOS sensors.

* * * * *